United States Patent [19]
Morii et al.

[11] Patent Number: 6,027,559
[45] Date of Patent: Feb. 22, 2000

[54] YELLOW IRON OXIDE HYDROXIDE PARTICLES AND PROCESS FOR PRODUCING THE SAME

[75] Inventors: Hiroko Morii; Mineko Ohsugi; Kazuyuki Hayashi; Hiroshi Sumita, all of Hiroshima, Japan

[73] Assignee: Toda Kogyo Corporation, Japan

[21] Appl. No.: 09/102,054

[22] Filed: Jun. 22, 1998

[30] Foreign Application Priority Data

Jun. 23, 1997 [JP] Japan ................................ 9-183133
Jun. 23, 1997 [JP] Japan ................................ 9-183134

[51] Int. Cl.⁷ .............................. C01G 49/06; C09C 1/24
[52] U.S. Cl. ......................... 106/456; 106/459; 428/403
[58] Field of Search .................................. 106/456, 459; 428/403; 423/632, 633

[56] References Cited

U.S. PATENT DOCUMENTS

| | | | |
|---|---|---|---|
| 4,291,010 | 9/1981 | Senda et al. | 423/594 |
| 4,374,677 | 2/1983 | Senda et al. | 106/459 |

FOREIGN PATENT DOCUMENTS

| | | |
|---|---|---|
| 0 704 500 A1 | 4/1996 | European Pat. Off. . |
| 53-102298 | 9/1978 | Japan . |
| 54-7293 | 4/1979 | Japan . |
| 55-8462 | 3/1980 | Japan . |
| 57-57755 | 4/1982 | Japan . |
| 2173143 | 7/1990 | Japan . |
| 9-165531 | 6/1997 | Japan . |

*Primary Examiner*—C. Melissa Koslow
*Attorney, Agent, or Firm*—Nixon & Vanderhye

[57] ABSTRACT

Yellow iron oxide hydroxide particles comprising:
iron oxide hydroxide particle as a core, and
composite oxide hydroxide of Fe and Al deposited on surface of said iron oxide hydroxide particle as a core wherein the amount of Al in said composite oxide hydroxide is 0.1 to 10% by weight, calculated as Al, based on the weight of said iron oxide hydroxide as a core, the amount of Fe in said composite oxide hydroxide is 0.1 to 50% by weight, calculated as Fe, based on the weight of said iron oxide hydroxide particle as a core, and the ratio of Al to Fe in said composite oxide hydroxide is 0.05:1 to 2:1, calculated as Al and Fe atoms,
said yellow iron oxide hydroxide particles having an average major axis diameter of 0.1 to 1.0 μm, an average minor axis diameter of 0.02 to 0.10 μm, an aspect ratio (major axis diameter/minor axis diameter) of 2 to 20, a BET specific surface area of 10 to 180 m²/g and a heat-resistance temperature of not less than 255° C. Such yellow iron oxide hydroxide particles not only have an excellent dispersibility and a further improved heat resistance but also exhibit less change in hue between before and after treatment for improving the heat resistance, and a process for producing such particles.

48 Claims, No Drawings

YELLOW IRON OXIDE HYDROXIDE PARTICLES AND PROCESS FOR PRODUCING THE SAME

BACKGROUND OF THE INVENTION

The present invention relates to yellow iron oxide hydroxide particles and a process for producing the particles, and more particularly, to yellow iron oxide hydroxide particles not only having an excellent dispersibility and a further improved heat resistance but also exhibiting less change in hue between before and after treatment for improving the heat resistance, and a process for producing such particles.

Yellow pigments have been extensively used in the form of dispersion in resins or vehicles as color pigments for the production of resin compositions, paints, printing inks and asphalt for road construction. Since yellow color is effective for indicating restraints, warnings or cautions in traffic control, the yellow pigments have been especially widely used to color pigments for asphalt for road construction or paints for traffic control signs (traffic paints).

These yellow pigments are required to exhibit not only an excellent dispersion in resins or vehicles but also an excellent heat resistance.

As conventional yellow pigments, there have been extensively used lead chromate, strontium chromate, cadmium sulfide, iron oxide hydroxide or the like.

The above-mentioned lead chromate, strontium chromate and cadmium sulfide have been widely used as color pigments for resins, paints, printing inks, etc., because of an excellent heat resistance thereof. However, it is known that these conventional yellow pigments exhibit toxicity and carcinogenicity. Therefore, there has been a strong demand for alternate yellow pigments from the viewpoints of hygiene and safety as well as prevention of environmental pollution.

On the other hand, the iron oxide hydroxide particles are nontoxic yellow pigments and, therefore, more suitable from the standpoints of not only hygiene and safety but also prevention of environmental pollution. However, there is a problem that the iron oxide hydroxide particles is deteriorated in heat resistance.

Specifically, since the iron oxide hydroxide particles has a chemical composition of $Fe_2O_3 \cdot nH_2O$, i.e., contain crystallization water therein, dehydration from the particles is generally initiated at about 200° C. as the heating temperature is elevated. When the heating temperature is further elevated, the iron oxide hydroxide particles are transformed into reddish brown hematite ($\alpha$-$Fe_2O_3$) at about 230° C.

For this reason, it is difficult to use the iron oxide hydroxide particles as a color pigment of thermoplastic resins such as polyethylene, polypropylene, styrene polymers, polyamides, polyolefins or ABS resins which are usually molded at as high a temperature as not less than 200° C., or traffic paints which are subjected to heating and melting treatments at a temperature of 200 to 260° C. upon use thereof.

In order to improve the heat resistance of the iron oxide hydroxide particles, various treatments have been proposed or attempted. However, since such iron oxide hydroxide particles show a large change in hue between before and after these treatments, it becomes difficult to attain a good product design from the viewpoint of hue which is essential and critical to color pigments. Accordingly, there has been a demand that the change in hue of the iron oxide hydroxide particles between before and after these heat resistance-improving treatments is as small as possible.

As various methods proposed of attempted to improve the heat resistance of iron oxide hydroxide particles, for example, hitherto, there have been proposed (1) a method of subjecting iron oxide hydroxide particles to hydrothermal treatment (autoclaving treatment) in water or in an aqueous alkaline solution using an autoclave (Japanese Patent Publication (KOKOKU) No. 53-28158(1978), etc.); (2) a method of coating surfaces of iron oxide hydroxide particles with an aluminum compound, a silicon compound or the like, a method of incorporating these compounds into the iron oxide hydroxide particles in the form of a solid solution thereof (Japanese Patent Publication (KOKOKU) No. 6-17237(1994), Japanese Patent Application Laid-open (KOKAI) No. 9-16553(1997), etc.); (3) a method using the combination of the above-mentioned methods (1) and (2) (Japanese Patent Publications (KOKOKU) Nos. 49-16531 (1974), 54-7293(1979) and 55-8462(1980), Japanese Patent Application Laid-open (KOKAI) No. 57-57755(1982), etc.); or the like.

More specifically, in Japanese Patent Application Laid-open (KOKAI) No. 9-165531 (which was laid-open on Jun. 24, 1997), there is described a process for producing heat-resistant yellow iron oxide hydroxide particles, which comprises heat-treating iron oxide hydroxide particles in an aqueous alkaline solution having a pH value of not less than 10, followed by filtering and washing with water, thereby reducing the content of a soluble sulfate in the iron oxide hydroxide particles to not more than 2,000 ppm (calculated as $SO_4$); heat-treating the yellow iron oxide hydroxide particles in an aqueous acid solution having a pH value of not more than 4, followed by filtering and washing with water, thereby reducing the content of a soluble sodium salt in the yellow iron oxide hydroxide particles to not more than 1,000 ppm (calculated as Na), thereby obtaining a high purity iron oxide hydroxide particles containing less amounts of the soluble sulfate and the soluble sodium salt; adjusting the pH value of a water dispersion containing the high purity iron oxide hydroxide particles to not less than 10 or not more than 4; adding an aluminum compound to the water dispersion, followed by stirring; and adjusting again the pH value of the resultant water dispersion to 5 to 9 to deposit a hydroxide of aluminum on surfaces of the high purity iron oxide hydroxide particles.

In Japanese Patent Publication (KOKOKU) No. 54-7293 (1979), there is described a process for producing a stabilized iron oxide pigment, which comprises hydrothermal-treating (autoclaving) an alkaline aqueous slurry containing iron oxide pigment particles at not more than 250° C., and treating the slurry under ordinary pressure in the presence of fine oxide hydroxide of at least one element selected from the group consisting of zirconium, titanium, aluminum and antimony to deposit the oxide hydroxide on surfaces of the pigment particles.

In Japanese Patent Publication (KOKOKU) No. 55-8462 (1980), there are described a heat-resistant yellow iron oxide hydroxide pigment containing AlOOH in the form thereof and, and a process for producing a heat-resistant yellow iron oxide hydroxide pigment containing AlOOH in the form thereof and, which comprises adding alkali to an aqueous solution of ferrous salt to form a colloidal precipitate; and after aging the colloidal precipitate, adding thereto a water-soluble or alkali-soluble aluminum compound and a water-soluble silicate, tin salt or zinc salt to conduct a hydrothermal treatment.

In Japanese Patent Application Laid-open (KOKAI) No. 57-57755(1982), there is described a method of improving properties of yellow iron oxide hydroxide pigment, which comprises dispersing yellow iron oxide hydroxide (having a chemical structure of α-FeOOH) in water or a 10N or less-alkali aqueous solution to conduct a hydrothermal treatment at 100 to 250° C.; and adding at least one of an oxide, an oxide salt and a hydroxide of silicon, aluminum or magnesium to the dispersion to conduct a hydrothermal treatment again at 100 to 250° C.

Presently, most demanded yellow iron oxide hydroxide particles are those not only having an excellent dispersibility and an enhanced heat resistance but also exhibiting less change in hue between before and after treatment for improving the heat resistance thereof. However, such yellow iron oxide hydroxide particles satisfying all of the above-mentioned properties have been still unavailable until now.

That is, in the case of the yellow iron oxide hydroxide particles treated by the above-mentioned method (1), although the heat resistance thereof is improved, the configuration and particle size distribution of the particles are considerably changed between before and after the heat resistance-improving treatment, resulting in large change in hue of the particles therebetween.

In the case of the yellow iron oxide hydroxide particles treated by the above-mentioned method (2), although the change in hue between before and after the heat resistance-improving treatment is restricted to a small level, the dispersibility and the heat resistance of the obtained particles are unsatisfactory because yellow iron oxide hydroxide particles as agglomerated are coated with an aluminum compound or the like.

Further, in the case of the yellow iron oxide hydroxide particles treated by the above-mentioned method (3), although the heat resistance is improved, the change in hue between before and after the heat resistance-improving treatment becomes considerably large similarly to those treated by the method (1).

The present inventors have already successfully produced yellow iron oxide hydroxide particles having not only an excellent dispersibility and an enhanced heat resistance but also less change in hue between the heat resistance improving treatment (Japanese Patent Application No. 7-348047 (1995) corresponding to Japanese Patent Application Laid-open (KOKAI) No. 9-165531(1997)).

However, it has been strongly demanded to still further improve properties of such yellow iron oxide hydroxide particles, especially dispersibility and heat resistance thereof, which exert significant influences on not only workability but also quality and functions of the yellow iron oxide hydroxide particles.

As a result of the present inventors' earnest studies, it has been found that by adding an aluminum compound and a ferrous salt compound to a water dispersion containing iron oxide hydroxide particles such that the amounts of the aluminum compound and ferrous salt compound added are 0.1 to 10% by weight (calculated as Al) and 0.1 to 50% by weight (calculated as Fe), respectively, based on the weight of the iron oxide hydroxide particles, followed by mixing together, and passing an oxygen-containing gas through the water dispersion to deposit a composite oxide hydroxide comprising Fe and Al on surfaces of the iron oxide hydroxide particles, the obtained yellow iron oxide hydroxide particles not only have an excellent dispersibility and an enhanced heat resistance but also exhibit less change in hue from that before the heat resistance-improving treatment (i.e., less change of a hue from comparison of the hue of yellow iron oxide hydroxide particles between before and after deposition of the composite oxide hydroxide thereon). The present invention has been attained on the basis of the finding.

SUMMARY OF THE INVENTION

It is an object of the present invention to provide yellow iron oxide hydroxide particles not only having an excellent dispersibility and an enhanced heat resistance but also exhibiting less change in hue between before and after heat resistance-improving treatment.

It is another object of the present invention to provide a pigment which is excellent in workability, dispersibility and heat resistance, and a paint containing such a pigment.

In a first aspect of the present invention, there is provided yellow iron oxide hydroxide particles comprising iron oxide hydroxide particle as a core and composite oxide hydroxide of Fe and Al deposited on surface of the iron oxide hydroxide particle, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 $\mu$m, an average minor axis diameter of 0.02 to 0.10 $\mu$m, an aspect ratio (major axis diameter/minor axis diameter) of 2 to 20, a BET specific surface area of 10 to 180 m$^2$/g and a heat-resistance temperature of not less than 255° C.

In a second aspect of the present invention, there is provided yellow iron oxide hydroxide particles comprising iron oxide hydroxide particle as a core and composite oxide hydroxide of Fe and Al deposited on surface of the iron oxide hydroxide particle, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 $\mu$m, an average minor axis diameter of 0.02 to 0.10 $\mu$m, an aspect ratio (major axis diameter/minor axis diameter) of 2 to 20, a BET specific surface area of 10 to 180 m$^2$/g, a heat-resistance temperature of not less than 255° C., a change in hue from that of the iron oxide hydroxide particle as a core, of $\Delta L^*$ value of $-1.0$ to $+1.0$, $\Delta a^*$ value of $-1.0$ to $+1.0$ and $\Delta b^*$ value of $-1.0$ to $+1.0$, and a gloss of 70 to 110% when light is irradiated on a coating film containing the yellow iron oxide hydroxide particles at an incident angle of 20°.

In a third aspect of the present invention, there is provided yellow iron oxide hydroxide particles comprising iron oxide hydroxide particle as a core, composite oxide hydroxide of Fe and Al deposited on surface of the iron oxide hydroxide particle as a core, and a hydroxide of aluminum deposited (or coated) on a surface of the composite oxide hydroxide, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 $\mu$m, an average minor axis diameter of 0.02 to 0.10 $\mu$m, an aspect ratio (major axis diameter/minor axis diameter) of 2 to 20, a BET specific surface area of 10 to 180 m²/g and a heat-resistance temperature of not less than 265° C.

In a fourth aspect of the present invention, there is provided yellow iron oxide hydroxide particles comprising iron oxide hydroxide particle as a core, composite oxide hydroxide of Fe and Al deposited on surface of the iron oxide hydroxide particle as a core, and a hydroxide of aluminum deposited (or coated) on a surface of the composite oxide hydroxide, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 μm, an average minor axis diameter of 0.02 to 0.10 μm, an aspect ratio (major axis diameter/minor axis diameter) of 2 to 20, a BET specific surface area of 10 to 180 m²/g, a heat-resistance temperature of not less than 265° C., a change in hue from that of the iron oxide hydroxide particle as a core, of $\Delta L^*$ value of −1.0 to +1.0, $\Delta a^*$ value of −1.0 to +1.0 and $\Delta b^*$ value of −1.0 to +1.0 and a gloss of 75 to 115% when light is irradiated on a coating film containing the yellow iron oxide hydroxide particles at an incident angle of 20°.

In a fifth aspect of the present invention, there is provided yellow iron oxide hydroxide particles comprising iron oxide hydroxide particle as a core and composite oxide hydroxide of Fe and Al deposited on surface of the iron oxide hydroxide particle as a core, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 μm, an average minor axis diameter of 0.02 to 0.10 μm, an aspect ratio (major axis diameter/minor axis diameter) of 2 to 20, a BET specific surface area of 10 to 180 m²/g and a heat-resistance temperature of not less than 265° C., a soluble sodium salt content of not more than 1,000 ppm (calculated as Na), and a soluble sulfate content of not more than 2,000 ppm (calculated as $SO_4$).

In a sixth aspect of the present invention, there is provided yellow iron oxide hydroxide particles comprising iron oxide hydroxide particle as a core and composite oxide hydroxide of Fe and Al deposited on surface of the iron oxide hydroxide particle as a core, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 μm, an average minor axis diameter of 0.02 to 0.10 μm, an aspect ratio (major axis diameter/minor axis diameter) of 2 to 20, a BET specific surface area of 10 to 180 m²/g, a heat-resistance temperature of not less than 265° C., a soluble sodium salt content of not more than 1,000 ppm (calculated as Na), a soluble sulfate content of not more than 2,000 ppm (calculated as $SO_4$), a change in hue from that of the iron oxide hydroxide particle as a core, of $\Delta L^*$ value of −1.0 to +1.0, $\Delta a^*$ value of −1.0 to +1.0 and $\Delta b^*$ value of −1.0 to +1.0, and a gloss of 85 to 120% when light is irradiated on a coating film containing the yellow iron oxide hydroxide particles at an incident angle of 20°.

In a seventh aspect of the present invention, there is provided yellow iron oxide hydroxide particles comprising iron oxide hydroxide particle as a core, composite oxide hydroxide of Fe and Al deposited on surface of the iron oxide hydroxide particle as a core and a hydroxide of aluminum deposited (or coated) on a surface of the composite oxide hydroxide, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 μm, an average minor axis diameter of 0.02 to 0.10 μm, an aspect ratio (major axis diameter/minor axis diameter) of 2 to 20, a BET specific surface area of 10 to 180 m²/g and a heat-resistance temperature of not less than 270° C., a soluble sodium salt content of not more than 1,000 ppm (calculated as Na), and a soluble sulfate content of not more than 2,000 ppm (calculated as $SO_4$).

In an eighth aspect of the present invention, there is provided yellow iron oxide hydroxide particles comprising iron oxide hydroxide particle as a core, composite oxide hydroxide of Fe and Al deposited on surface of the iron oxide hydroxide particle as a core and a hydroxide of aluminum deposited (or coated) on a surface of the composite oxide hydroxide, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 μm, an average minor axis diameter of 0.02 to 0.10 μm, an aspect ratio (major axis diameter/minor axis diameter) of 2 to 20, a BET specific surface area of 10 to 180 m²/g, a heat-resistance temperature of not less than 270° C., a soluble sodium salt content of not more than 1,000 ppm (calculated as Na), a soluble sulfate content of not more than 2,000 ppm (calculated as $SO_4$), a change in hue from that of the iron oxide hydroxide particle as a core, of $\Delta L^*$ value of −1.0 to +1.0, $\Delta a^*$ value of −1.0 to +1.0 and $\Delta b^*$ value of −1.0 to +1.0, and a gloss of 85 to 120% when light is irradiated on a coating film containing the yellow iron oxide hydroxide particles at an incident angle of 20°.

In a ninth aspect of the present invention, there is provided a pigment comprising yellow iron oxide hydroxide particles as defined in any one of the above-mentioned 1st to 8th aspect.

In a tenth aspect of the present invention, there is provided a paint comprising a paint base material and the pigment as defined in the above-mentioned 9th aspect.

In an eleventh aspect of the present invention, there is provided rubber or resin composition comprising a rubber or resin base material and the pigment as defined in the above-mentioned 9th aspect.

In a twelfth aspect of the present invention, there is provided a process for producing heat-resistant yellow iron oxide hydroxide particles, comprising:

adding to a water dispersion containing iron oxide hydroxide particles, an aluminum compound and a ferrous salt compound in amounts of 0.1 to 10% by weight, calculated as Al, and 0.1 to 50% by weight, calculated as Fe, respectively, based on the weight of said iron oxide hydroxide particles, under stirring; and passing an oxygen-containing gas through the resultant water dispersion to deposit a composite oxide hydroxide of Fe and Al on surfaces of said iron oxide hydroxide particles, thereby obtaining yellow iron oxide hydroxide particles on which said composite oxide hydroxide of Fe and Al is deposited.

In a thirteenth aspect of the present invention, there is provided a process for producing heat-resistant yellow iron oxide hydroxide particles, comprising:

adding to a water dispersion containing iron oxide hydroxide particles, an aluminum compound and a ferrous salt compound in amounts of 0.1 to 10% by weight, calculated as Al, and 0.1 to 50% by weight, calculated as Fe, respectively, based on the weight of said iron oxide hydroxide particles, under stirring; and passing an oxygen-containing gas through said water dispersion to deposit a composite oxide hydroxide of Fe and Al on surfaces of said iron oxide hydroxide particles;

adjusting the pH value of said water dispersion containing said iron oxide hydroxide particles on which said composite oxide hydroxide is deposited, to not less than 10 or not more than 4;

adding an aluminum compound to said water dispersion under stirring;

adjusting the pH value of said water dispersion to 5 to 9 to deposit a hydroxide of aluminum on a surface of said composite oxide hydroxide, thereby obtaining yellow iron oxide hydroxide particles on which said composite oxide hydroxide of Fe and Al and said hydroxide of aluminum are successively deposited.

In an fourteenth aspect of the present invention, there is provided a process for producing heat-resistant yellow iron oxide hydroxide particles, comprising:

heat-treating iron oxide hydroxide particles in an aqueous alkaline solution having a pH value of not less than 10, followed by filtering and washing with water, thereby reducing the content of a soluble sulfate in said iron oxide hydroxide particles to not more than 2,000 ppm, calculated as $SO_4$;

heat-treating the obtained iron oxide hydroxide particles in an aqueous acid solution having a pH value of not more than 4, followed by filtering and washing with water, thereby reducing the content of a soluble sodium salt in said iron oxide hydroxide particles to not more than 1,000 ppm, calculated as Na, to obtain high purity iron oxide hydroxide particles containing less amounts of said soluble sulfate and said soluble sodium salt;

adding to a water dispersion containing said high purity iron oxide hydroxide particles, an aluminum compound and a ferrous salt compound in amounts of 0.1 to 10% by weight, calculated as Al, and 0.1 to 50% by weight, calculated as Fe, respectively, based on the weight of said high purity iron oxide hydroxide particles, under stirring; and passing an oxygen-containing gas through said water dispersion to deposit a composite oxide hydroxide of Fe and Al on surfaces of said high purity iron oxide hydroxide particles, thereby obtaining high purity yellow iron oxide hydroxide particles on which said composite oxide hydroxide of Fe and Al is deposited.

In a fifteenth aspect of the present invention, there is provided a process for producing heat-resistant yellow iron oxide hydroxide particles, comprising:

heat-treating iron oxide hydroxide particles in an aqueous alkaline solution having a pH value of not less than 10, followed by filtering and washing with water, thereby reducing the content of a soluble sulfate in said iron oxide hydroxide particles to not more than 2,000 ppm, calculated as $SO_4$;

heat-treating the obtained iron oxide hydroxide particles in an aqueous acid solution having a pH value of not more than 4, followed by filtering and washing with water, thereby reducing the content of a soluble sodium salt in said iron oxide hydroxide particles to not more than 1,000 ppm, calculated as Na, to obtain high purity iron oxide hydroxide particles containing less amounts of said soluble sulfate and said soluble sodium salt;

adding a water dispersion containing said high purity iron oxide hydroxide particles, an aluminum compound and a ferrous salt compound in amounts of 0.1 to 10% by weight, calculated as Al, and 0.1 to 50% by weight, calculated as Fe, respectively, based on the weight of said high purity iron oxide hydroxide particles, under stirring;

passing an oxygen-containing gas through said water dispersion to deposit a composite oxide hydroxide of Fe and Al on surfaces of said high purity iron oxide hydroxide particles;

adjusting the pH value of said water dispersion containing said high purity iron oxide hydroxide particles on which said composite oxide hydroxide is deposited, to not less than 10 or not more than 4;

adding an aluminum compound to said water dispersion, followed by stirring; and adjusting the pH value of said water dispersion to 5 to 9 to deposit a hydroxide of aluminum on a surface of said composite oxide hydroxide, thereby obtaining high purity yellow iron oxide hydroxide particles on which said composite oxide hydroxide of Fe and Al and said hydroxide of aluminum are successively deposited.

DETAILED DESCRIPTION OF THE INVENTION

The yellow iron oxide hydroxide particles in the first aspect of the present invention, comprise iron oxide hydroxide particle as a core and composite oxide hydroxide of Fe and Al deposited on surface of the iron oxide hydroxide particle as a core.

The amount of Al in the composite oxide hydroxide deposited is 0.1 to 10% by weight, preferably 0.15 to 8.0% by weight (calculated as Al), based on the weight of the iron oxide hydroxide particle as a core. When the amount of Al is less than 0.1% by weight, aimed effects of the present invention, i.e., effects for improving dispersibility and heat resistance of the particles, cannot be obtained. On the other hand, when the amount of Al is more than 10% by weight, the aimed effects of the present invention are already almost saturated and, therefore, the use of such a large amount of Al is economically disadvantageous.

The amount of Fe in the composite oxide hydroxide deposited is 0.1 to 50% by weight, preferably 0.15 to 30% by weight (calculated as Fe), based on the weight of the iron oxide hydroxide particle as a core. When the amount of Fe is less than 0.1% by weight, aimed effects of the present invention, i.e., effects for improving dispersibility and heat resistance of the particles, cannot be obtained. On the other hand, when the amount of Fe is more than 50% by weight, the aimed effects of the present invention are already almost saturated and, therefore, the use of such a large amount of Fe is economically disadvantageous.

The ratio of Al:Fe in the composite oxide hydroxide deposited is 1:0.5 to 1:20 (0.05:1 to 2:1), preferably 1:1 to 1:10 (0.1:1 to 1:1) (calculated as Al and Fe atoms). When the ratio of Al:Fe is out of the above-mentioned range, aimed effects of the present invention, i.e., effects for improving dispersibility and heat resistance of the particles, cannot be obtained.

The yellow iron oxide hydroxide particles of the present invention, may have an average major axis diameter of 0.1 to 1.0 $\mu$m, preferably 0.15 to 0.8 $\mu$m, an average minor axis diameter of 0.02 to 0.10 $\mu$m, preferably 0.025 to 0.08 $\mu$m, an aspect ratio (major axis diameter/minor axis diameter) 2 to 20, preferably 2.5 to 15, and a BET specific surface area of 10 to 180 $m^2/g$, preferably 12 to 150 $m^2/g$.

The heat-resistance temperature of the yellow iron oxide hydroxide particles in the first aspect of the present invention is usually not less than 255° C., preferably not less than 265° C., more preferably not less than 270° C.

The yellow iron oxide hydroxide particles in the second aspect of the present invention may further exhibit less change in hue between before and after heat resistance-improving treatment, specifically may exhibit such a small change in hue from that of the iron oxide hydroxide particle as a core, as represented by $\Delta L^*$ value of usually −1.0 to +1.0, preferably −0.5 to +0.5, $\Delta a^*$ value of usually −1.0 to +1.0, preferably −0.5 to +0.5 and $\Delta b^*$ value of usually −1.0 to +1.0, preferably −0.5 to +0.5.

In addition, the yellow iron oxide hydroxide particles in the second aspect of the present invention may further exhibit a gloss of 70 to 110%, preferably 80 to 110% when light is irradiated on a coating film containing the yellow iron oxide hydroxide particles at an incident angle of 20°. This indicates that the yellow iron oxide hydroxide particles according to the present invention can show an excellent dispersibility.

The yellow iron oxide hydroxide particles in the third aspect of the present invention, comprise iron oxide hydroxide particle as a core, composite oxide hydroxide of Fe and Al deposited on surface of the iron oxide hydroxide particle as a core, and a hydroxide of aluminum deposited on a surface of the composite oxide hydroxide.

The amount of the hydroxide of aluminum deposited on the surface of the composite oxide hydroxide according to the present invention is usually 0.1 to 20.0% by weight, preferably 0.15 to 5.0% by weight (calculated as Al) based on the weight of the iron oxide hydroxide particle as a core on which the composite oxide hydroxide is deposited. When the amount of the hydroxide of aluminum deposited is less than 0.1% by weight, aimed effects of the present invention, i.e., effects for improving dispersibility and heat resistance of the particles, may not be obtained. On the other hand, when the amount of the hydroxide of aluminum deposited is more than 20% by weight, the aimed effects of the present invention are already almost saturated and, therefore, the use of such a large amount of the hydroxide of aluminum deposited is economically disadvantageous.

The heat-resistance temperature of the yellow iron oxide hydroxide particles in the third aspect of the present invention is not less than 265° C., preferably not less than 275° C. Further, the yellow iron oxide hydroxide particles in the fourth aspect of the present invention may exhibit a gloss of 75 to 115%, preferably 85 to 115% when light is irradiated on a coating film containing the yellow iron oxide hydroxide particles at an incident angle of 20°. This indicates that the above-defined yellow iron oxide hydroxide particles can show an excellent dispersibility.

Incidentally, the average major axis diameter, the average minor axis diameter, the aspect ratio and the BET specific surface area of the yellow iron oxide hydroxide particles in the third aspect of the present invention, are substantially the same as those in the first aspect of the present invention. In addition, the yellow iron oxide hydroxide in the fourth aspect of the present invention may also exhibit substantially the same small change in hue between before and after the heat resistance-improving treatment according to the present invention, more specifically substantially the same $\Delta L^*$, $\Delta a^*$ and $\Delta b^*$ values which represent the change in hue from that of the iron oxide hydroxide as a core, as those defined in the second aspect of the present invention.

The yellow iron oxide hydroxide particles in the fifth aspect of the present invention, are high purity yellow iron oxide hydroxide particles which comprise iron oxide hydroxide particle as a core and composite oxide hydroxide of Fe and Al deposited on surface of the iron oxide hydroxide particle as a core, and have a soluble sodium salt content of usually not more than 1,000 ppm, preferably not more than 700 ppm, more preferably not more than 500 ppm (calculated as Na), and a soluble sulfate content of usually not more than 2,000 ppm, preferably not more than 1,500 ppm, more preferably not more than 1,000 ppm (calculated as $SO_4$).

By limiting the soluble sodium salt content and the soluble sulfate content to the above-specified ranges, aimed effects of the present invention, i.e., effects for improving dispersibility and heat resistance of the particles, can be achieved in more excellent.

The heat-resistance temperature of the yellow iron oxide hydroxide particles in the fifth aspect of the present invention is not less than 265° C., preferably not less than 275° C., more preferably not less than 280° C. Further, the yellow iron oxide hydroxide particles in the sixth aspect of the present invention may exhibit a gloss of 80 to 120%, preferably 85 to 120% when light is irradiated on a coating film containing the yellow iron oxide hydroxide particles at an incident angle of 20°. This indicates that the yellow iron oxide hydroxide particles can also show an excellent dispersibility.

Incidentally, the average major axis diameter, the average minor axis diameter, the aspect ratio and the BET specific surface area of the yellow iron oxide hydroxide particles in the fifth aspect of the present invention, are substantially the same as those defined in the first aspect of the present invention. In addition, the yellow iron oxide hydroxide in the sixth aspect of the present invention may also exhibit substantially the same small change in hue between before and after the heat resistance-improving treatment according to the present invention, more specifically substantially the same $\Delta L^*$, $\Delta a^*$ and $\Delta b^*$ values which represent the change in hue from that of the iron oxide hydroxide as a core, as those in the second aspect of the present invention.

The yellow iron oxide hydroxide particles in the seventh aspect of the present invention, are high purity yellow iron oxide hydroxide particles which comprise iron oxide hydroxide particle as a core, composite oxide hydroxide of Fe and Al deposited on surface of the iron oxide hydroxide particle as a core, and a hydroxide of aluminum deposited on a surface of the composite oxide hydroxide, and have a soluble sodium salt content of usually not more than 1,000 ppm, preferably not more than 700 ppm, more preferably not more than 500 ppm (calculated as Na), and a soluble sulfate content of usually not more than 2,000 ppm, preferably not more than 1,500 ppm, more preferably not more than 1,000 ppm (calculated as $SO_4$).

By controlling the soluble sodium salt content and the soluble sulfate content to the above-specified ranges, aimed effects of the present invention, i.e., effects for improving dispersibility and heat resistance of the particles, can be achieved in more excellent.

The amount of the hydroxide of aluminum deposited on the surface of the composite oxide hydroxide is 0.1 to 20.0% by weight, preferably 0.15 to 5.0% by weight (calculated as Al) based on the weight of the iron oxide hydroxide particle as a core on which the composite oxide hydroxide is deposited. When the amount of the hydroxide of aluminum deposited is less than 0.1% by weight, aimed effects of the present invention, i.e., effects for improving dispersibility and heat resistance of the particles, may not be obtained. On the other hand, when the amount of the hydroxide of aluminum deposited is more than 20% by weight, the aimed effects of the present invention are already almost saturated and, therefore, the use of such a large amount of the hydroxide of aluminum deposited is economically disadvantageous.

The heat-resistance temperature of the yellow iron oxide hydroxide particles in the seventh aspect of the present invention is not less than 270° C., preferably not less than 280° C. Further, the yellow iron oxide hydroxide particles in the eighth of the present invention may have a gloss of 85 to 120%, preferably 90 to 120% when light is irradiated on a coating film containing the yellow iron oxide hydroxide particles at an incident angle of 20°. This indicates that the yellow iron oxide hydroxide particles can also show an excellent dispersibility.

Incidentally, the average major axis diameter, the average minor axis diameter, the aspect ratio and the BET specific surface area of the yellow iron oxide hydroxide particles in the seventh aspect of the present invention, are substantially the same as those defined in the first aspect of the present invention. In addition, the yellow iron oxide hydroxide in the eighth aspect of the present invention may also exhibit substantially the same small change in hue between before and after the heat resistance-improving treatment of the present invention, more specifically substantially the same $\Delta L^*$, $\Delta a^*$ and $\Delta b^*$ values which represent the change in hue from that of the iron oxide hydroxide as a core, as those defined in the second aspect of the present invention.

The yellow iron oxide hydroxide particles according to the present invention are useful as a yellow pigment because of an inherent color tone thereof.

The yellow pigment according to the present invention may be used as color pigments for a water-based paint, a solvent-based paint and a rubber or resin composition.

Next, the water-based paint and solvent-based paint according to the present invention is described as follows.

The water-based paint according to the present invention is a paint prepared by using water as a main solvent, and therefore, includes both water-soluble paints and water-dispersion paints. The water-dispersion paints may further include emulsion-type paints and colloidal dispersion-type paints. The water-based paint according to the present invention comprises a paint base material and a color pigment dispersed therein. The amount of the color pigment dispersed may be in the range of 10 to 90 parts by weight based on 100 parts by weight of the paint base material. In view of handling of the obtained paint, the amount of the color pigment dispersed is preferably in the range of 20 to 60 parts by weight, more preferably 30 to 50 parts by weight based on 100 parts by weight of the paint base material.

Meanwhile, the color pigment according to the present invention can also be suitably applied to organic solvent-type paints. In this case, the organic solvent-type paint comprises a paint base material and a color pigment dispersed therein. The amount of the color pigment dispersed may be in the range of 10 to 90 parts by weight based on 100 parts by weight of the basic constituting material. In view of handling of the obtained organic solvent-type paint, the amount of the pigment dispersed is preferably 20 to 60 parts by weight, more preferably 30 to 50 parts by weight based on 100 parts by weight of the paint base material.

The paint base material may contain, if required, extender pigment particles, a drying accelerator, a surfactant, a curing promoter, auxiliaries or the like.

The amount of the solvent used in the paint according to the present invention is preferably 50 to 5,000 parts by weight, more preferably 100 to 2,000 parts by weight based on 100 parts by weight of the resin. When the amount of the solvent is less than 50 parts by weight based on 100 parts by weight of the resin, the vehicle viscosity of the paint may become too high so that it is difficult to perform homogeneous mixing and dispersion. On the other hand, when the amount of the solvent is more than 5,000 parts by weight, the solvent content in the paint may increase to such an extent that the dispersing shear force does not act on the particles during mixing and dispersion.

The resins for water-based paints usable in the present invention may include those commonly used for this purpose, such as water-soluble alkyd resins, water-soluble acrylic resins, water-soluble urethane resins, water-soluble epoxy resins, water-soluble melamine resins, acrylic emulsion resin, acrylic styrene emulsion resins, urethane emulsion resins, epoxy emulsion resins, vinyl acetate emulsion resins or the like.

As the resins for organic solvent-type paints, there can be used those commonly used for this purpose, such as acrylic resins, alkyd resins, polyester resins, polyurethane resins, epoxy resins, phenol resins, melamine resins, amino resins or the like.

Examples of the solvents for water-based paints used in the present invention may include those commonly used for this purpose, such as water, butyl cellosolve, ethyl cellosolve, propylene glycol, monomethyl ether, methyl cellosolve acetate, butoxyethyl acetate, ethoxyethanol, hexoxyethanol, methyl ethyl ketone, phenyl glycol ether, ethanol, butyl alcohol, butoxyethanol, propanol, propoxypropanol or the like.

As the solvents for organic solvent-type paints, there can be exemplified those commonly used for this purpose, such as toluene, xylene, butyl acetate, methyl acetate, methyl isobutyl ketone, butyl cellosolve, ethyl cellosolve, butyl alcohol, aliphatic hydrocarbons or the like.

As the defoaming agents used in the present invention, there may be exemplified commercially available products such as NOPCO 8034, SN DEFOAMER 477, SN DEFOAMER 5013, SN DEFOAMER 247, SN DEFOAMER 382 (tradenames: produced by SANNOPCO CO., LTD.), ANTIFOAM 08, EMULGEN 903 (tradenames: produced by KAO CO., LTD.) or BYK-020 (tradename: produced by BYK CO., LTD.).

In the water-based paints, there may also be used film-forming assistants such as alcohols or glycol ethers.

The emulsion-type paints can be prepared by adding a pigment, an additive, water and if necessary, an organic solvent to an emulsion resin. As the additives, there may be exemplified dispersant, rust preventive, defoaming agent, film-forming agent or the like. As the film-forming agents, there may be used higher alcohols, glycols and hydrocarbons.

The colloidal dispersion-type paints may be composed of a colloidal dispersion resin, a pigment, an additive, a neutralizer, water, an organic solvent or the like.

As the additives for the colloidal dispersion-type paints, there may be exemplified dispersant, defoaming agent, rust preventive or the like, i.e., the same additives as those for the emulsion-type paints except film-forming agent.

The water-based paints may be composed of a water-soluble resin, a pigment, an additive, water, an organic solvents or the like. As the additives for the water-based paints, there may be exemplified dispersant, defoaming agent, neutralizer, rust preventive or the like.

In addition, if required, the water-based paint may further contain extender pigment, aggregate, neutralizer, film-forming assistant, pigment dispersant, pigment wetting agent, thickener (viscosity-imparting agent), antiseptic agent, mildew proofing agent, antifreezing agent, rust preventive, dryer or the like.

The water-based paint according to the present invention can be produced by dispersing the pigment according to the present invention and the above-mentioned paint base material in specific weight ratios in water by a commonly used mixer such as ball mill, roll mill, homomixer, shaker, attritor or sand grinder.

The rubber or resin composition according to the present invention is described in detail.

In the rubber or resin composition according to the present invention, the color pigment may be blended therein in an amount of 0.01 to 200 parts by weight based on 100 parts by weight of a constituent base material for the rubber or resin composition. In view of easiness in handling the rubber or resin composition, the amount of the color pigment blended therein is preferably in the range of 0.05 to 100 parts by weight, more preferably 0.1 to 50 parts by weight.

The constituent base material for the rubber or resin composition according to the present invention may contain a conventional rubber or thermoplastic resin and if required, other additives such as a lubricant, a plasticizer, an anti-oxidant, an ultraviolet light absorber or various other stabilizers.

The amount of the additive added is not more than 50% by weight based on the total weight of the color pigment and the rubber or the thermoplastic resin. When the amount of the additive added is more than 50% by weight, the moldability of the composition is deteriorated.

The rubber or resin composition according to the present invention can be used in the form of a molded product which is prepared by preliminarily intimately mixing the rubber or resin raw material and the color pigment with each other, applying an intense shearing force to the mixture while heating by using a kneader or an extruder to destroy aggregates of the color pigment and homogeneously disperse the color pigment in the rubber or the resin, and thereafter molding the resultant mixture into an aimed shape.

The iron oxide hydroxide particles used as a core in the present invention may be produced by the following methods:

(A) A method of passing an oxygen-containing gas through a suspension containing ferrous hydroxide colloid obtained by adding to an aqueous ferrous salt solution, an aqueous alkali hydroxide solution in an amount of not less than one equivalent based on the aqueous ferrous salt solution, so as to subject the suspension to oxidation reaction at a pH value of not less than 11 and a temperature of not less than 80° C., thereby producing acicular iron oxide hydroxide (goethite) particles;

(B) A method of passing an oxygen-containing gas through a suspension containing $FeCO_3$ obtained by reacting an aqueous ferrous salt solution with an aqueous alkali carbonate solution, if required, after aging the suspension, so as to subject the suspension to oxidation reaction at pH value of 8 to 10, thereby producing spindle-shaped iron oxide hydroxide (goethite) particles;

(C) A method of passing an oxygen-containing gas through an aqueous ferrous salt solution containing ferrous hydroxide colloid obtained by adding to an aqueous solution of ferrous salt, an aqueous alkali hydroxide solution or aqueous alkali carbonate solution in an amount of less than one equivalent based on the aqueous solution of ferrous salt, so as to subject the aqueous ferrous salt solution to oxidation reaction, thereby producing acicular iron oxide hydroxide (goethite) core particles from the solution having a pH value of not more than 4; mixing the aqueous ferrous salt solution containing the acicular iron oxide hydroxide (goethite) core particles with not less than one equivalent of an aqueous alkali hydroxide solution based on $Fe^{2+}$ in the aqueous ferrous salt solution; and then passing an oxygen-containing gas through the resultant mixed solution so as to subject the solution to oxidation reaction, thereby growing the acicular iron oxide hydroxide (goethite) core particles in the solution having a pH value of not less than 11; and (D) A method of passing an oxygen-containing gas through an aqueous ferrous salt solution containing ferrous hydroxide colloid obtained by adding to an aqueous solution of ferrous salt, an aqueous alkali hydroxide solution or aqueous alkali carbonate solution in an amount of less than one equivalent based on the aqueous solution of ferrous salt, so as to subject the aqueous ferrous salt solution to oxidation reaction, thereby producing acicular iron oxide hydroxide (goethite) core particles from the solution having a pH value of not more than 5; and then growing the acicular iron oxide hydroxide (goethite) core particles in an acidic to neutral solution.

The thus produced iron oxide hydroxide particles are filtered out, washed with water and dried by ordinary methods to obtain iron oxide hydroxide particles having an average major axis diameter of 0.1 to 1.0 μm, an average minor axis diameter of 0.02 to 0.10 μm, an aspect ratio (major axis diameter/minor axis diameter) of 2 to 20, a BET specific surface area of 10 to 180 $m^2/g$ and a hue represented by L* value of 50 to 75, a* value of 5 to 25 and b* value of 40 to 60.

Incidentally, for the purpose of adjusting a hue of the iron oxide hydroxide particles, different kinds of elements other than Fe such as Ni, Zn, P, Si, Al or the like may be added during the reaction for producing the iron oxide hydroxide (goethite) particles to appropriately control various properties of the particles such as major axis diameter, minor axis diameter, aspect ratio or the like. In this case, the obtained iron oxide hydroxide particles may contain these different kinds of elements other than Fe.

The iron oxide hydroxide particles used as a core in the present invention may be of any configuration, e.g., the particles may be used in the form of a wet cake obtained by subjecting the iron oxide hydroxide particles produced from the above-mentioned reaction solution to filtering-out and washing with water; a dispersed slurry obtained by dispersing the wet cake in water; dried particles obtained by drying the wet cake; or a re-dispersed slurry obtained by dispersing again the dried particles in water. Among them, the dispersed slurry is preferred from the viewpoints of efficiency and workability.

Meanwhile, the iron oxide hydroxide particles obtained by subjecting the yellow iron oxide hydroxide particles produced in the reaction solution to filtering-out and washing with water by ordinary methods, may usually contain a soluble sulfate derived from an aqueous ferrous sulfate solution as a raw iron material, in an amount of usually about 3,000 to about 10,000 ppm (calculated as $SO_4$), and a soluble sodium salt derived from sodium hydroxide as a raw alkali material, in an amount of usually about 1,500 to about 10,000 ppm (calculated as Na).

In accordance with The present invention, the deposition of composite oxide hydroxide of Fe and Al on surfaces of the iron oxide hydroxide particles may be conducted by adding an aluminum compound and a ferrous salt compound to a water suspension containing the iron oxide hydroxide particles, followed by mixing together, and then passing an oxygen-containing gas through the water suspension. From the standpoint of the production of composite oxide hydroxide of Fe and Al, it is preferred that the oxygen-containing gas be passed through the water suspension while maintaining the pH value of the water suspension at not more than 5 or not less than 10. The concentration of the iron oxide hydroxide particles in the water suspension may be adjusted to about 5 to about 150 g/liter. Further, from the viewpoint of productivity, the concentration of the iron oxide hydroxide particles in the water suspension is preferably about 10 to about 120 g/liter, more preferably about 20 to about 100 g/liter.

As the aluminum compounds added, there may be used alkali aluminates such as sodium aluminate, aluminum salts such as aluminum sulfate, aluminum chloride, aluminum acetate or aluminum nitrate, or the like. The amount of the aluminum compound added is 0.1 to 10% by weight (calculated as Al) based on the weight of the iron oxide hydroxide particles. When the amount of the aluminum compound added is less than 0.1% by weight, aimed effects of the present invention, i.e., effects of improving dispersibility and heat resistance of the particles cannot be obtained. On the other hand, when the amount of the aluminum compound added is more than 10% by weight, the aimed effects of the present invention are already substantially saturated and, therefore, it is unnecessary to add an excessively large amount of the aluminum compound.

As the aqueous ferrous salt solutions added, there may be used aqueous solutions of ferrous salts such as ferrous sulfate, ferrous chloride or ferrous nitrate. The amount of the ferrous salt added is 0.1 to 50% by weight (calculated as Al) based on the weight of the iron oxide hydroxide particles. When the amount of the ferrous salt added is less than 0.1% by weight, aimed effects of the present invention, i.e., effects of improving dispersibility and heat resistance of the particles cannot be obtained. On the other hand, when the amount of the ferrous salt added is more than 50% by weight, the aimed effects of the present invention are already substantially saturated and, therefore, it is unnecessary to add an excessively large amount of the aluminum compound.

The ratio of the aluminum compound to the aqueous ferrous salt solution is preferably 1:0.5 to 1:20 (0.05:1 to 2:1), more preferably 1:1 to 1:10 (0.1:1 to 1:1), calculated as an atomic ratio Al/Fe, in view of aimed effects of the present invention, i.e., effects of improving dispersibility and heat resistance of the particles.

Almost whole amounts of aluminum and iron contained in the aluminum compound and the aqueous ferrous salt solution, respectively, are deposited in the form of composite oxide hydroxide of Fe and Al, on surfaces of the iron oxide hydroxide particles. Therefore, the ratio between Fe and Al contained in the composite oxide hydroxide of Fe and Al is substantially the same as that contained in the aluminum compound and the aqueous ferrous salt solution added.

The order of addition of the aluminum compound and the aqueous ferrous salt solution is optional. Accordingly, any of the aluminum compound and the aqueous ferrous salt solution may be added first, or both thereof may be added simultaneously.

As the oxidation method, there may be used a method of passing an oxygen-containing gas (e.g., air) through the suspension while agitating the suspension by the gas passed therethrough or by mechanical operations, or the like.

The yellow iron oxide hydroxide particles produced by the process of the present invention on which the composite oxide hydroxide of Fe and Al is deposited, may have substantially the same average major axis diameter, average minor axis diameter, aspect ratio (major axis diameter/minor axis diameter) and BET specific surface area as those of the above-mentioned treated iron oxide hydroxide particle as a core. Therefore, the yellow iron oxide hydroxide particles on which the composite oxide hydroxide of Fe and Al is deposited, can also exhibit an excellent dispersibility. The gloss of the above yellow iron oxide hydroxide particles is 70 to 110%, preferably 80 to 110% when forming a film. Further, the above yellow iron oxide hydroxide particles has an enhanced heat resistance, especially a heat-resistance temperature of not less than 255° C., preferably not less than 265° C., more preferably not less than 270° C. The above yellow iron oxide hydroxide particles can also exhibit less change in hue between before and after the heat resistance-improving treatment, specifically can show a $\Delta L^*$ value of $-1.0$ to $+1.0$, preferably $-0.5$ to $+0.5$; a $\Delta a^*$ value of $-1.0$ to $+1.0$, preferably $-0.5$ to $+0.5$; and a $\Delta b^*$ value of $-1.0$ to $+1.0$, preferably $-0.5$ to $+0.5$.

Next, in accordance with the present invention, a hydroxide of aluminum may be further deposited, if required, on the surface of the composite oxide hydroxide of Fe and Al which is deposited on surface of the iron oxide hydroxide particle as a core. In this case, the deposition of the hydroxide of aluminum may be conducted by adjusting the pH value of a water suspension containing the yellow iron oxide hydroxide particles on which the composite oxide hydroxide of Fe and Al is deposited, to not less than 10 or not more than 4; adding an aluminum compound to the suspension under stirring; and adjusting again the pH value of the resultant water suspension to 5 to 9.

The pH value of the water suspension upon deposition of the hydroxide of aluminum may be adjusted by adding an ordinarily used aqueous alkaline solution or aqueous acid solution thereto.

As the aqueous alkaline solution, there may be used an aqueous sodium hydroxide solution, an aqueous potassium hydroxide solution, an aqueous ammonia solution or the like.

As the acid solution, there may be used aqueous solutions of hydrochloric acid, nitric acid, acetic acid, oxalic acid, sulfuric acid or the like.

The pH value of the water suspension before adding the aluminum compound thereto is required to be not less than 10 or not more than 4. When the pH value of the water suspension before addition of the aluminum compound is less than 10 and more than 4, the aluminum compound added is immediately precipitated in the form of hydroxide of aluminum, and it becomes difficult to uniformly deposit the hydroxide of aluminum over the surface of the composite oxide hydroxide of Fe and Al which is deposited on surfaces of the iron oxide hydroxide particles.

After completion of addition of the aluminum compound, the resultant water suspension was stirred at a pH value of not less than 10 or not more than 4. When the pH value is less than 10 and more than 4, it is unlikely that an ionic aluminum salt is uniformly mixed and dispersed in the water suspension containing the yellow iron oxide hydroxide particles. As a result, it becomes difficult to uniformly deposit the hydroxide of aluminum over the surface of the composite oxide hydroxide of Fe and Al which is deposited on surfaces of the iron oxide hydroxide particles.

As the temperature of the water suspension upon precipitation or deposition of the hydroxide of aluminum on the surface of the composite oxide hydroxide of Fe and Al which is deposited on surfaces of the iron oxide hydroxide particles, there may be used ordinary temperature, but in order to achieve uniform deposition of the hydroxide of aluminum, the temperature of the water suspension is maintained at preferably not less than 40° C., more preferably not less than 60° C.

When the hydroxide of aluminum is deposited on the surface of the composite oxide hydroxide of Fe and Al which is deposited on surfaces of the iron oxide hydroxide particles, after stirring, the pH value of the water suspension was adjusted again to 5 to 9. When the pH value of the water suspension is less than 5 or more than 9, it becomes difficult to precipitate or deposit the hydroxide of aluminum on the surface of the composite oxide hydroxide of Fe and Al which is deposited on surfaces of the iron oxide hydroxide particles as cores.

The amount of the aluminum compound added is 0.1 to 20.0% by weight (calculated as Al) based on the weight of the yellow iron oxide hydroxide particles on which the composite oxide hydroxide of Fe and Al is deposited. When the amount of the aluminum compound added is less than 0.1% by weight, it becomes difficult to deposit a sufficient amount of the hydroxide of aluminum on the surface of the composite oxide hydroxide of Fe and Al which is deposited on surfaces of the iron oxide hydroxide particles. As a result, it also becomes difficult to obtain aimed effects of the present invention, i.e., effects of improving dispersibility and heat resistance of the particles. On the other hand, when the amount of the aluminum compound added is more than 20.0% by weight, the aimed effects are already almost saturated and, therefore, it is unnecessary to use an excessively large amount of the aluminum compound. In view of improved dispersibility and enhanced heat resistance of the yellow iron oxide hydroxide particles, the amount of the aluminum compound added is preferably 0.15 to 5.0% by weight (calculated as Al).

Substantially a whole amount of aluminum in the aluminum compound added can be deposited as the hydroxide of aluminum on the surface of the composite oxide hydroxide of Fe and Al which is deposited on surfaces of the iron oxide hydroxide particles.

The yellow iron oxide hydroxide particles produced by the process of the present invention on which the composite oxide hydroxide of Fe and Al and the hydroxide of aluminum are successively deposited, may have substantially the same average major axis diameter, average minor axis diameter, aspect ratio (major axis diameter/minor axis diameter) and BET specific surface area as those of the iron oxide hydroxide particle as a core. Therefore, the yellow iron oxide hydroxide particles on which the composite oxide hydroxide of Fe and Al and the hydroxide of aluminum are successively deposited, can also exhibit an excellent dispersibility. Especially, the gloss of the above yellow iron oxide hydroxide particles is 75 to 115%, preferably 85 to 115% when forming a film. In addition, the above yellow iron oxide hydroxide particles may exhibit an enhanced heat resistance, specifically a heat-resistance temperature of not less than 265° C., preferably not less than 275° C. Further, the above yellow iron oxide hydroxide particles can also exhibit less change in hue between before and after the heat resistance-improving treatment, specifically can show a $\Delta L^*$ value of −1.0 to +1.0, preferably −0.5 to +0.5; a $\Delta a^*$ value of −1.0 to +1.0, preferably −0.5 to +0.5; and a $\Delta b^*$ value of −1.0 to +1.0, preferably −0.5 to +0.5.

Separately, the iron oxide hydroxide particles obtained from the reaction solution by ordinary methods may be subjected to high purification treatment.

As the high purification treatment according to the present invention, there may be used a heat-treatment which is conducted by heating the iron oxide hydroxide particles in an aqueous alkaline solution having a pH value of not less than 10. More specifically, in the heat-treatment, the iron oxide hydroxide particles in the form of a wet cake, a dispersed slurry, dried particles or a re-dispersed slurry as specified above, are mixed in water to prepare a water suspension containing the iron oxide hydroxide particles. After the pH value of the water suspension is then adjusted to not less than 10 by adding an aqueous alkaline solution thereto, the resultant water suspension (alkaline suspension) is heat-treated.

As the aqueous alkaline solution used for the adjustment of pH value of the water suspension, there may be exemplified aqueous solutions of sodium hydroxide, potassium hydroxide or the like.

The concentration of the iron oxide hydroxide particles in the water suspension is about 2 to about 150 g/liter, preferably about 3 to about 100 g/liter in view of efficiency for removing the soluble sulfate.

When the pH value of the water suspension is less than 10, it becomes difficult to sufficiently extract out and remove the soluble sulfate absorbed into the iron oxide hydroxide particles or attached to the surfaces thereof. The pH value of the water suspension is preferably not less than 10.5 in view of efficiency for removing the soluble sulfate. However, it is unnecessary to use an excessively high pH value of the water suspension, and the upper limit of the pH value is about 13.9 in view of economy.

The heating temperature of the alkaline suspension containing the iron oxide hydroxide particles is preferably not less than 40° C., more preferably not less than 60° C. The upper limit of the heating temperature is preferably set to 100° C. When the heating temperature is less than 40° C., it may disadvantageously take a long period of time to extract out and remove the soluble sulfate from the particles. On the other hand, when the heating temperature is more than 100° C., it may be required to use special devices such as an autoclave, and the obtained yellow iron oxide hydroxide particles may undergo a disadvantageously large change in hue between before and after the heat resistance-improving treatment.

The heat-treatment of the alkaline suspension containing the iron oxide hydroxide particles may be conducted until the soluble sulfate content in the iron oxide hydroxide particles is reduced to not more than 2,000 ppm, preferably not more than 1,500 ppm, more preferably not more than 1,000 ppm, still more preferably not more than 500 ppm (calculated as $SO_4$). In the case where the iron oxide hydroxide particles contain the soluble sulfate in an amount of about 3,000 to about 10,000 ppm (calculated as $SO_4$), the heat-treatment is conducted usually for not less than 30 minutes, preferably not less than 60 minutes. However, it is unnecessary to excessively prolong the heat-treatment, and in view of the efficiency for removing the soluble sulfate and economy, the upper limit of the time required for the heat-treatment is preferably about 360 minutes.

Another heat-treatment as the high purification treatment according to the present invention may be conducted by heat-treating the iron oxide hydroxide particles in an aqueous acid solution having a pH value of not more than 4. More specifically, in the heat-treatment, the iron oxide hydroxide particles in the form of a wet cake, a dispersed slurry, dried particles or a re-dispersed slurry as specified above, are mixed in water to prepare a water suspension containing the iron oxide hydroxide particles. After the pH value of the resultant water suspension is then adjusted to not more than 4 by adding an aqueous acid solution thereto, the water suspension (acidic suspension) is heat-treated.

As the aqueous acid solution used for the adjustment of pH value of the water suspension, there may be exemplified aqueous solutions of hydrochloric acid, nitric acid, acetic acid, oxalic acid or the Like.

The concentration of the iron oxide hydroxide particles in the water suspension is about 2 to about 150 g/liter, preferably about 3 to about 100 g/liter in view of efficiency for removing the soluble sodium salt.

When the pH value of the water suspension is more than 4, it becomes difficult to sufficiently extract out and remove the soluble sodium salt strongly absorbed into the iron oxide hydroxide particles or attached to the surfaces thereof. The pH value of the water suspension is preferably not more than 3.5 in view of efficiency for removing the soluble sodium salt. However, it is unnecessary to add an excessively large amount of the aqueous acid solution to the water suspension, and the lower limit of the pH value is preferably about 0.1 in view of economy.

The heating temperature of the acidic suspension is preferably not less than 40° C., more preferably not less than 60° C. The upper limit of the heating temperature is preferably not more than 100° C. When the heating temperature is less than 40° C., it disadvantageously takes a long period of time to extract out and remove the soluble sodium salt from the particles. On the other hand, when the heating temperature is more than 100° C., it is required to use special devices such as an autoclave, and the obtained yellow iron oxide hydroxide particles undergo a disadvantageously large change in hue between before and after the heat resistance-improving treatment.

The heat-treatment of the acidic suspension containing the iron oxide hydroxide particles may be conducted until the soluble sodium salt content in the iron oxide hydroxide particles is reduced to not more than 1,000 ppm, preferably not more than 700 ppm, more preferably not more than 500 ppm, still more preferably not more than 250 ppm (calculated as Na). In the case where the iron oxide hydroxide particles contain the soluble sodium salt in an amount of about 1,500 to about 10,000 ppm (calculated as Na), the heat-treatment may be conducted usually for not less than 30 minutes, preferably not less than 60 minutes. However, it is unnecessary to excessively prolong the heat-treatment, and in view of efficiency for removing the soluble sodium salt and economy, the upper limit of the time required for the heat-treatment is preferably about 360 minutes.

The heat-treatment in the alkaline suspension having a pH value of not less than 10 and the heat-treatment in the acidic suspension having a pH value of not more than 4, may be conducted in any optional order. Any of these heat-treatments can be conducted first. After completion of the first heat-treatment, the iron oxide hydroxide particles treated may be filtered out and washed with water. Thereafter, the obtained iron oxide hydroxide particles may be dispersed again in water and subjected to the second heat-treatment.

For example, after the heat-treatment in the alkaline suspension having a pH value of not less than 10 and the heat-treatment in the acidic suspension having a pH value of nor more than 4 are completed, the iron oxide hydroxide particles in the suspension may be filtered out and washed with water by ordinary methods.

The thus obtained iron oxide hydroxide particles may have a soluble sulfate content of not more than 2,000 ppm, preferably not more than 1,500 ppm, more preferably not more than 1,000 ppm, still more preferably not more than 500 ppm (calculated as $SO_4$). The lower limit of the soluble sulfate content is preferably about 0.1 ppm in view of industrial suitability and economy. In addition, the iron oxide hydroxide particles may have a soluble sodium salt content of not more than 1,000 ppm, preferably not more than 700 ppm, more preferably not more than 500 ppm, still more preferably not more than 250 ppm (calculated as Na). The lower limit of the soluble sodium salt content is preferably about 0.1 ppm in view of industrial suitability and economy.

The iron oxide hydroxide particles obtained by subjecting to the heat-treatment in the alkaline suspension having a pH value of not less than 10 and the heat-treatment in the acidic suspension having a pH value of not more than 4 according to the present invention, are high purity particles as described above. As a result of observation by an electron microscope, it is determined that individual particles are present in a separated state without agglomeration thereof.

In accordance with the present invention, after completion of the above-mentioned heat-treatments for high purification of the iron oxide hydroxide particles, the obtained high purity iron oxide hydroxide particles in the form of a wet cake obtained by subjecting the particles to filtering-out and washing with water, a dispersed slurry obtained by dispersing the wet cake in water, dried particles obtained by drying the wet cake or a re-dispersed slurry obtained by dispersing again the dried particles in water, are mixed in water to prepare a water suspension containing the high purity iron oxide hydroxide particles.

Next, after an aluminum compound and a ferrous salt compound are mixed in the waster suspension containing the high purity iron oxide hydroxide particles, an oxygen-containing gas is caused to pass through the water suspension. From the viewpoint of production of the composite oxide hydroxide of Fe and Al, it is preferred that the oxygen-containing gas be passed through the water suspension while maintaining the pH value of the water suspension at not more than 5 or not less than 10. The concentration of the high purity iron oxide hydroxide particles in the water suspension may be adjusted to usually about 5 to about 150 g/liter. In view of productivity, the concentration of the high purity iron oxide hydroxide particles in the water suspension is preferably about 10 to about 120 g/liter, more preferably about 20 to about 100 g/liter.

The high purity yellow iron oxide hydroxide particles produced according to the process of the present invention on which the composite oxide hydroxide of Fe and Al is deposited, may have substantially the same average major axis diameter, average minor axis diameter, aspect ratio (major axis diameter/minor axis diameter) and BET specific surface area as those of the above-treated iron oxide hydroxide particle as a core. Therefore, the high purity yellow iron oxide hydroxide particles on which the composite oxide hydroxide of Fe and Al is deposited can also exhibit an excellent dispersibility. In addition, the gloss of the above high purity yellow iron oxide hydroxide particles is 80 to 120%, preferably 85 to 120% when forming a film. Besides, the above high purity yellow iron oxide hydroxide particles may exhibit an enhanced heat resistance, specifically a heat-resistance temperature of not less than 265° C., preferably not less than 275° C., more preferably not less than 280° C. Further, the high purity yellow iron oxide hydroxide particles may also exhibit less change in hue between before and after the heat resistance-improving treatment, specifically can show a $\Delta L^*$ value of $-1.0$ to $+1.0$, preferably $-0.5$ to $+0.5$; a $\Delta a^*$ value of $-1.0$ to $+1.0$, preferably $-0.5$ to $+0.5$; and a $\Delta b^*$ value of $-1.0$ to $+1.0$, preferably $-0.5$ to $+0.5$.

Next, the high purity yellow iron oxide hydroxide particles on which the composite oxide hydroxide of Fe and Al is deposited, is further deposited with the hydroxide of aluminum, if necessary, as described above.

The high purity yellow iron oxide hydroxide particles produced by the process of the present invention on which the composite oxide hydroxide of Fe and Al and the hydroxide of aluminum which are successively deposited, may have substantially the same average major axis diameter, average minor axis diameter, aspect ratio (major axis diameter/minor axis diameter) and BET specific surface area as those of the above-treated iron oxide hydroxide particle as a core. Therefore, the high purity yellow iron oxide hydroxide particles on which the composite oxide hydroxide of Fe and Al and the hydroxide of aluminum are successively deposited, may also exhibit an excellent dispersibility. In addition, the gloss of the above high purity yellow iron oxide hydroxide particles is 85 to 120%, preferably 90 to 120% when forming a film. Besides, the above high purity yellow iron oxide hydroxide particles may exhibit an enhanced heat resistance, specifically a heat-resistance temperature of not less than 270° C., preferably 280° C. Further, the above high purity yellow iron oxide hydroxide particles may also exhibit less change in hue between before and after the heat resistance-improving treatment, specifically can show a $\Delta L^*$ value of $-1.0$ to $+1.0$, preferably $-0.5$ to $+0.5$; a $\Delta a^*$ value of $-1.0$ to $+1.0$, preferably $-0.5$ to $+0.5$; and a $\Delta b^*$ value of $-1.0$ to $+1.0$, preferably $-0.5$ to $+0.5$.

One of the most important features of the present invention exists in such a fact that when the aluminum compound and the ferrous salt compound are mixed in the water dispersion containing the iron oxide hydroxide particles, in amounts of 0.1 to 10% by weight (calculated as Al) and 0.1 to 50% by weight (calculated as Fe), respectively, based on the weight of the iron oxide hydroxide particles and the oxygen-containing gas is passed through the water dispersion to deposit the composite oxide hydroxide of Fe and Al on surfaces of the iron oxide hydroxide particles, the obtained yellow iron oxide hydroxide particles comprising iron oxide hydroxide particle as a core and composite oxide hydroxide of Fe and Al deposited on surfaces of the iron oxide hydroxide particles, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 $\mu$m, an average minor axis diameter of 0.02 to 0.10 $\mu$m, an aspect ratio (major axis diameter/minor axis diameter) of 2 to 20, a BET specific surface area of 10 to 180 $m^2/g$ and a heat-resistance temperature of not less than 255° C., exhibits not only an excellent dispersibility and an enhanced heat resistance but also less change in hue between before and after the heat resistance-improving treatment.

Also, in the present invention, after the pH value of the water dispersion containing the above-prepared yellow iron oxide hydroxide particles on which the composite oxide hydroxide of Fe and Al is deposited, is adjusted to not less than 10 or not more than 4, an aluminum compound may be added to the water dispersion, followed by stirring, and then the pH value of the water dispersion may be adjusted again to 5 to 9, thereby depositing the hydroxide of aluminum on surfaces of the particles. The thus produced yellow iron oxide hydroxide particles comprising iron oxide hydroxide particle as a core, composite oxide hydroxide of Fe and Al deposited on surface of the iron oxide hydroxide particle as a core, and a hydroxide of aluminum deposited on a surface of the composite oxide hydroxide, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 $\mu$m, an average minor axis diameter of 0.02 to 0.10 $\mu$m, an aspect ratio (major axis diameter/minor axis diameter) of 2 to 20, a BET specific surface area of 10 to 180 $m^2/g$ and a heat-resistance temperature of not less than 265° C., exhibit a more excellent dispersibility and a further enhanced heat resistance as well as less change in hue between before and after the heat resistance-improving treatment.

The reason why the yellow iron oxide hydroxide particles on which the composite oxide hydroxide of Fe and Al is deposited or the yellow iron oxide hydroxide particles on which the composite oxide hydroxide of Fe and Al and the hydroxide of aluminum are successively deposited, can exhibit an improved dispersibility, is considered by the present inventors as follows, though not clearly known. That is, it is considered that the improved dispersibility is attributed to improvement in compatibility between the yellow iron oxide hydroxide particles and vehicle resin, for such reasons that the gloss of a coating film containing the particles is increased and the viscosity of a paint containing the particles is decreased, or the like.

In addition, the reason why the heat resistance is enhanced, is considered by the present inventors such that the composite oxide hydroxide of Fe and Al tends to form a dense layer and contains Fe whereby the composite oxide hydroxide of Fe and Al comes into close contact with surfaces of the iron oxide hydroxide particles upon deposition.

The reason why the heat resistance of the yellow iron oxide hydroxide particles on which the composite oxide hydroxide of Fe and Al and the hydroxide of aluminum are successively deposited can be further enhanced, is considered by the present inventors such that the hydroxide of aluminum itself has an excellent heat resistance and since the lower composite oxide hydroxide deposition contains Al, the upper hydroxide of aluminum deposition constituted by the hydroxide of aluminum can be brought into close contact with the lower composite oxide hydroxide deposition.

Further, another most important feature of the present invention exists in such a fact that by heat-treating the iron oxide hydroxide particles in an aqueous alkaline solution having a pH value of not less than 10, followed by filtering-out and washing with water, thereby reducing the soluble sulfate content to not more than 2,000 ppm (calculated as $SO_4$); heat-treating the iron oxide hydroxide particles in an aqueous acid solution having a pH value of not more than 4, followed by filtering-out and washing with water, thereby reducing the soluble sodium salt content to not more than 1,000 ppm (calculated as Na), thereby producing high purity iron oxide hydroxide particles having less soluble sulfate content and less soluble sodium salt content; adding an aluminum compound and a ferrous salt compound to a water dispersion containing the high purity iron oxide hydroxide particles in amounts of 0.1 to 10% by weight (calculated as Al) and 0.1 to 50% by weight (calculated as Fe), respectively, based on the weight of the high purity iron oxide hydroxide particles, followed by mixing together; and passing an oxygen-containing gas through the water dispersion to deposit a composite oxide hydroxide of Fe and Al on surfaces of the high purity iron oxide hydroxide particles, the obtained high purity yellow iron oxide hydroxide particles comprising iron oxide hydroxide particle as a core and composite oxide hydroxide of Fe and Al deposited on surface of the iron oxide hydroxide particle as a core, wherein the amount of Al in the composite oxide hydroxide is 0.1 to 10% by weight (calculated as Al) based on the weight of the iron oxide hydroxide particle as a core, the amount of Fe in the composite oxide hydroxide is 0.1 to 50% by weight (calculated as Fe) based on the weight of the iron oxide hydroxide particle as a core and the ratio of Al to Fe in the composite oxide hydroxide is 1:0.5 to 1:20 (0.05:1 to 2:1) (calculated as Al and Fe atoms); and having an average major axis diameter of 0.1 to 1.0 $\mu$m, an average minor axis diameter of 0.02 to 0.10 $\mu$m, an aspect ratio (major axis diameter/minor axis diameter) of 2 to 20, a BET specific surface area of 10 to 180 $m^2/g$ and a heat-resistance temperature of not less than 265° C., a soluble sodium salt content of not more than 1,000 ppm (calculated as Na), and a soluble sulfate content of not more than 2,000 ppm (calculated as $SO_4$), exhibit a more excellent dispersibility and a further enhanced heat resistance as well as less change in hue between before and after the heat resistance-improving treatment.

The reason why the heat resistance of the high purity yellow iron oxide hydroxide particles can be further enhanced, is considered by the present inventors such that by preparing the high purity iron oxide hydroxide particles in advance of depositing the composite oxide hydroxide of Fe and Al on surface thereof, it becomes possible to sufficiently separate secondary agglomerated iron oxide hydroxide particles into individual particles, and therefore, deposit a sufficiently uniform layer of the composite oxide hydroxide of Fe and Al on surfaces of the thus separated individual particles, and since the composite oxide hydroxide of Fe and Al tends to form a dense layer and contains Fe therein, the composite oxide hydroxide of Fe and Al can be deposited on surfaces of the iron oxide hydroxide particles in a close contact state In addition, the reason why the high purity iron oxide hydroxide particles on which the hydroxide of aluminum is further deposited can be still further enhanced, is considered by the present inventors such that the hydroxide of aluminum itself shows an excellent heat resistance and since the lower composite oxide hydroxide layer contains Al, the upper layer composed of the hydroxide of aluminum can be deposited thereon in a close contact state.

The fact that the above-mentioned high purity iron oxide hydroxide particles are constituted of sufficiently separated particles which are free from secondary agglomeration, is explained below.

When ferrous sulfate is used as a raw material for iron, as a matter of course, a large amount of soluble sulfate $[SO_4^{2-}]$ is contained in a reaction mother solution, and the resultant iron oxide hydroxide (goethite) particles produced by precipitation from such a reaction solution, has a high soluble sulfate content as described above.

Especially, in the case where the iron oxide hydroxide (goethite) particles are produced by precipitating from an acid solution, soluble sulfates such as $Na_2SO_4$ may be produced simultaneously. Further, since the acid solution contains alkali metals such as $K^+$, $NH_4^+$ or $Na^+$, the precipitate produced therefrom is likely to contain alkali metals or sulfates. The precipitate may be represented by the formula of $RFe_3(SO_4)(OH)_6$ (wherein R is $K^+$, $NH_4^+$ or $Na^+$). Since these precipitates are insoluble sulfates, it is not possible to remove these precipitate by ordinary water-washing methods.

In the case where the iron oxide hydroxide (goethite) particles are precipitated from the aqueous alkaline solution having a pH value of not less than 11 by using ferrous sulfate and sodium hydroxide, the sulfate simultaneously produced is $Na_2SO_4$ and the aqueous alkaline mother solution contains NaOH. Since both of $Na_2SO_4$ and NaOH are water-soluble, it is theoretically possible to remove $Na_2SO_4$ and NaOH by sufficiently washing the iron oxide hydroxide (goethite) particles with water.

However, the iron oxide hydroxide (goethite) particles generally has a low crystallinity, and therefore, shows a deteriorated water-washing efficiency. Consequently, in the case where the iron oxide hydroxide (goethite) particles are washed with water by ordinary methods, large amounts of soluble sulfates $[SO_4^{2-}]$ and soluble sodium salts $[Na^{30}]$still remain in the particles.

The above-mentioned soluble sulfates or soluble sodium salts are contained within the iron oxide hydroxide particles or attached to surfaces thereof, so that the iron oxide hydroxide (goethite) particles mat be bonded with each other through the soluble sulfates or soluble sodium salts and strongly bonded together, thereby forming a much stronger agglomeration between the iron oxide hydroxide particles. However, in the case where the agglomerated iron oxide hydroxide (goethite) particles are heat-treated in an aqueous alkaline solution having a pH value of not less than 10, the aqueous alkaline solution is sufficiently penetrated from the surface of the agglomerated iron oxide hydroxide (goethite) particles into interior thereof, so that a bonding force of the sulfates strongly bonded to surfaces and interior of the individual particles and interior of the agglomerated particles, is gradually weakened. As a result, it is considered that the sulfates are liberated from the surfaces and interior of the individual particles and the interior of the agglomerated particles, and further the soluble sodium salts are likely to be washed out with water simultaneously.

On the other hand, in the case where the agglomerated iron oxide hydroxide (goethite) particles are heat-treated in an aqueous acid solution having a pH value of not more than 4, the aqueous acid solution sufficiently penetrates from surfaces of the agglomerated iron oxide hydroxide (goethite) particles into interior thereof, so that a bonding force of the sodium salts strongly bonded to surfaces and interior of the individual particles and interior of the agglomerated particles, is gradually weakened. As a result, it is considered that the sodium salts are liberated from the surfaces and interior of the individual particles and the interior of the agglomerated particles, and the soluble sulfates are likely to be washed out with water simultaneously.

As is well known, a heat-resistant paint (coating material) is generally one which displays a function as a coating film even in a temperature range of not lower than 200° C. Polyimideamide resin paints, silicon resin paints and fluorine resin paints are ones having a special function which are so excellent in heat resistance as to be resistant in a temperature range of 300 to 650° C. The heat-resistant inorganic pigment of the present invention is suitable as a color pigment for these heat-resistant paints.

For example, the yellow color in a road sign represents 'regulation' or 'warning' and is therefore very important. However, since the color pigment used for a yellow coating film of a road sign is chiefly chrome yellow, the influence of the yellow coating film on the environment such as dust of the abraded coating film and the elusion of the yellow pigment due to rain water is in serious problem. The 'road sign yellow' represented by the number 'P31-2611' in the color sample book (1989) published by the Nihon Toryo Kogyo Kai is "5.5YR6.5/12" by the Munsell color standard in Japan. The hue of the pigment obtained in Example 2 which will be described later is "5YR6/12" by the Munsell color standard in Japan. These hues closely resemble each other, and the yellow iron oxide hydroxide pigment of the present invention has a sufficient heat resistance to the heating and melting temperature at the time of film coating. Consequently, if the pigment is used for a coating film of a road sign as a color pigment, the above-described problems is solved.

In addition, since the heat-resistant yellow iron oxide hydroxide pigment of the present invention is a harmless inorganic calcined product, it does not cause an environmental pollution resulting from a color pigment containing lead, chrome or cadmium. The present invention can therefore be said to have a great industrial utility.

As described above, the yellow iron oxide hydroxide particles according to the present invention can exhibit not only an excellent dispersibility and an enhanced heat resistance but also less change in hue between before and after the heat resistance-improving treatment. Therefore, the yellow iron oxide hydroxide particles according to the present invention can be suitably used as yellow pigments, especially yellow pigments for road asphalt or paints for traffic control signs (traffic paints).

Further, in the process for the production of yellow iron oxide hydroxide particles according to the present invention, as described above, the improved yellow iron oxide hydroxide particles can be produced under ordinary pressure without using special devices such as an autoclave. Therefore, the process according to the present invention is industrially and economically useful.

EXAMPLES

The present invention will be described in more detail below by examples, but these examples are only illustrative and, therefore, not intended to limit the scope of the present invention.

In the below-mentioned Examples and Comparative Examples, various properties of yellow iron oxide hydroxide particles were measured by the following methods.

(1) The average major axis diameter and average minor axis diameter were respectively expressed by average values of major axis diameters and minor axis diameters of 350 particles which were sampled from an enlarged electron photomicrograph obtained by expanding an original electron photomicrograph (×20,000) by two times in each of the longitudinal and transverse directions.

(2) Specific surface area:

The specific surface area of the yellow iron oxide hydroxide particles were measured according to a BET method.

(3) pH of Particles:

5 g of yellow iron oxide hydroxide sample particles were weighed and charged into a 300 ml conical flask. 100 ml of pure water was added to the sample particles in the conical flask. The content of the conical flask was heated and maintained in a boiled state for 5 minutes. Thereafter, the conical flask was plugged and the content of the flask was allowed to stand until it was cooled down to ordinary temperature. The flask was opened and supplied with pure water in such an amount corresponding to reduction in weight of pure water in the flask. The flask was plugged again and shaken for 1 minute for mixing. After the content of the flask was allowed to stand for 5 minutes, the pH value of the resultant supernatant was measured according to JIS Z 8802-7. The thus-obtained pH value was determined as the pH value of the yellow iron oxide hydroxide particles.

(4) Contents of Soluble Sodium Salt and Soluble Sulfate:

The supernatant prepared for the above pH value measurement was filtered through a filter paper No. 5C. Amounts of $Na^+$ and $SO_4^{2-}$ were measured by an inductively-coupled plasma atomic emission spectrometer SPS-4000 (manufactured by SEIKO DENSHI KOGYO Co., Ltd.).

(5) The amount of Al deposited on surfaces of yellow iron oxide hydroxide particles was measured by fluorescent X-ray spectroscopy device 3063 M type (manufactured by RIGAKU DENKI KOGYO Co., Ltd.).

(6) The atomic ratio Al/Fe upon deposition of composite oxide hydroxide of Fe and Al in the production of heat-resistant yellow iron oxide hydroxide particles was expressed by values obtained according to the following method.

That is, 0.25 g of the heat-resistant yellow iron oxide hydroxide particles were weighed and charged into a 100 ml conical flask, and then mixed with 33.3 ml of ion exchange water. The flask was placed in a water bath heated to 60° C., and the content therein was stirred for 20 minutes by a magnetic stirrer, thereby obtaining an intimately dispersed water suspension.

Next, the water suspension was mixed with 16.7 ml of a 12N-hydrochloric acid solution and stirred for 20 minutes. As a result, a portion of the composite oxide hydroxide of Fe and Al deposited on the surface of each iron oxide hydroxide particle as a core which portion extends from an outer surface of the composite oxide hydroxide up to approximately a mid point of the distance between the outer surface of the composite oxide hydroxide and the outer surface of the iron oxide hydroxide particle as a core (i.e., one-half thickness of the composite oxide hydroxide) and has a substantially uniform composition, was dissolved out with the acid from the outermost surface thereof toward the inside of the particle (This fact was already confirmed in many experiments).

Thereafter, the water suspension containing the dissolved-out component was subjected to suction filtration using a 0.1 µm membrane filter. The amounts (ppm) of Al and Fe in the obtained filtrate were measured by an inductively-coupled plasma atomic emission spectrometer SPS-4000 (manufactured by SEIKO DENSHI KOGYO Co., Ltd.). Further, the amount (% by weight) of Fe in the composite oxide hydroxide of Fe and Al was calculated from the ratio of Al to Fe obtained from the measured amounts (ppm) of Al and Fe in the filtrate and the amount (% by weight) of Al in the composite oxide hydroxide obtained by the above-mentioned measurement method (5), according to the following formula.

Amount of Fe (% by weight)=Amount of Al (% by weight)×1/(Ratio of Al to Fe)

Furthermore, the atomic ratio of Al to Fe in the composite oxide hydroxide of Fe and Al was expressed by a ratio between respective values obtained by dividing the amounts (% by weight) of Fe and Al by respective atomic weights.

(7) The heat resistance of yellow iron oxide hydroxide was expressed by the temperature read out from a DSC chart obtained by subjecting a test sample to differential scanning calorimetry (DSC) using a thermal analyzing apparatus SSC-5000 (manufactured by SEIKO DENSHI KOGYO Co., Ltd.), which temperature was read at a crossing point of two tangential lines on two curves constituting the first one of two inflection points which form a peak on the DSC chart.

(8) The hue ($L^*$ value, $a^*$ value and $b^*$ value) were measured by the following method.

Test samples obtained by using (i) a solvent-based paint prepared by the following method, (ii) a water-based paint prepared by the method of Example 45, and (iii) a resin composition prepared by the method of Example 65, were used for measuring the hue.

That is, the solvent-based paint or the water-based paint was applied onto a cold rolled steel plate (0.8 mm×70 mm×150 mm; JIS G-3141) and then dried to form a coating film having a thickness of 150 µm thereon.

(i) The $L^*$ value (lightness), the $a^*$ value (redness) and the $b^*$ value (yellowness) representing hue of the yellow iron oxide hydroxide, were expressed by respective values of the test sample measured in the Lab space of Hunter in accordance with the ($L^*$, $a^*$ and $b^*$) uniform sensory color space of Commission Internationnale de l'Eclairage, CIE, 1976.

(ii) The $L^*$ value (lightness), the $a^*$ value (redness) and the $b^*$ value (yellowness) representing hue of the coating film prepared by the water-based paint, were expressed by respective values of the test sample measured in the Lab space of Hunter in accordance with the ($L^*$, $a^*$ and $b^*$) uniform sensory color space of Commission Internationnale de l'Eclairage, CIE, 1976.

(iii) The $L^*$ value (lightness), the $a^*$ value (redness) and the $b^*$ value (yellowness) representing hue of the resin composition, were expressed by respective values of the test sample measured in the Lab space of Hunter in accordance with the ($L^*$, $a^*$ and $b^*$) uniform sensory color space of Commission Internationnale de l'Eclairage, CIE, 1976. Incidentally, the measurements of the $L^*$ value, the $a^*$ value and the $b^*$ value were conducted by using Multi Spectro Colour Meter (MSC-IS-2D, manufactured by SUGA TESTING MACHINES MANUFACTURING CO., LTD.).

The solvent-based saint was prepared as follows.

10 g of the yellow iron oxide hydroxide pigment was charged together with alkyd resin and thinner shown below, into 140 ml glass bottle. These components were intimately mixed and dispersed together with 90 g of 3 mmφ glass beads by a paint shaker for 90 minutes to prepare a mill base.

| Composition of mill base: | |
|---|---|
| Yellow iron oxide hydroxide pigment | 12.2 parts by weight |
| Amino-alkyd resin (AMILAC No. 1026 produced by KANSAI PAINT CO., LTD.) | 19.5 parts by weight |
| Thinner | 7.3 parts by weight |

Next, the above-prepared mill base and an amino-alkyd resin were blended together at a weight ratio shown below and further intimately mixed and dispersed by a paint shaker for 15 minutes to prepare a solvent-based paint.

| Composition of solvent-based paint: | |
|---|---|
| Mill base | 39.0 parts by weight |
| Amino-alkyd resin (AMILAC No. 1026 produced by KANSAI PAINT CO., LTD.) | 61.0 parts by weight |

(9) The change in hue of yellow iron oxide hydroxide was expressed by $\Delta L^*$, $\Delta a^*$ and $\Delta b^*$ which represent the difference in respective measured $L^*$, $a^*$ and $b^*$ values of yellow iron oxide hydroxide particles between before and after the heat resistance-improving treatment. The smaller the absolute values of $\Delta L^*$, $\Delta a^*$ and $\Delta b^*$, the less the change in hue.

(10) The gloss of yellow iron oxide hydroxide and the coating film was determined by measuring the gloss of the above-mentioned test samples by a digital glossmeter (UGV-5D, manufactured by SUGA TESTING MACHINES MANUFACTURING CO., LTD.) when light was irradiated on the test sample at an incident angle of 20°. The higher the gloss, the more excellent the dispersibility.

(11) Viscosity of saint:

The viscosity at 25° C. of the water-based paint prepared according to the procedure mentioned in Example 45 was measured by E-type viscometer (cone plate-type viscometer) EMD-R (manufactured by TOKYO KEIKI CO., LTD.). The viscosity was represented by the value at a shear rate (D) of 1.92 sec$^{-1}$.

(12) Heat resistance of water-based paint:

The coating films obtained by the method of Example 45 were heat-treated at a temperature of 150° C., 200° C., 250° C., 280° C., 300° C. or 320° C. for 15 minutes. After being allowed to stand for cooling, a hue of the sample films (i.e., $L^*$ value, $a^*$ value and $b^*$ value) was measured and compared with that before the heat-treatment to determine an amount of change of hue thereof. Using the measured value before the heat-treatment as a reference value, the amount of change of hue represented by $\Delta E^*$ was obtained according to the following formula:

$$\Delta E^* = \{(\Delta L^*)^2 + (\Delta a^*)^2 + (\Delta b^*)^2\}^{1/2}$$

wherein ΔL* represents a difference in L* value between before and after heat-treatment of the sample particles; Δa* represents a difference in a* value between before and after heat-treatment of the sample particles; and Δb* represents a difference in b* value between before and after heat-treatment of the sample coating film.

The temperature was an axis of abscissa and the ΔE* value was an axis of ordinate, and the obtained results were plotted thereon. The temperature in which the ΔE* value exceeded 1.5 was expressed as the heat-resistance temperature of the coating film.

(13) Dispersibility of Resin Composition:

The number of undispersed aggregate particles on a surface of the obtained resin composition were visually counted and evaluated by classifying into the following five ranks. The 5th rank represents most excellent dispersing condition.

Rank 5: No undispersed aggregate particles were recognized;

Rank 4: 1 to 4 undispersed aggregate particles per 1 $cm^2$ were recognized;

Rank 3: 5 to 9 undispersed aggregate particles per 1 $cm^2$ were recognized;

Rank 2: 10 to 49 undispersed aggregate particles per 1 $cm^2$ were recognized;

Rank 1: not less than 50 undispersed aggregate particles per 1 $cm^2$ were recognized.

(14) Heat Resistance of resin composition:

A colored resin plate (50 mm×50 mm×1 mm) molded from a resin composition prepared by the method of Example 65 was heat-treated at a temperature of 170° C., 190° C., 210° C., 230° C. or 240° C. for 10 minutes under a pressure of 1 $t/cm^2$ by using a hot-press.

After being allowed to stand for cooling, a hue of the sample resin composition (i.e., L* value, a* value and b* value) was measured and compared with that before the heat-treatment to determine an amount of change of hue thereof. Using the measured value before the heat-treatment as a reference value, the amount of change of hue represented by ΔE* was obtained according to the formula mentioned in the above (12) "heat resistance of water-based paint".

The temperature was an axis of abscissa and the ΔE* value was an axis of ordinate, and the obtained results were plotted thereon. The temperature in which the ΔE* value exceeded 1.5 was expressed as the heat-resistance temperature of the resin composition.

Example 1

A wet cake (water-containing solid) of acicular iron oxide hydroxide (goethite) particles precipitated from an aqueous acid solution according to the above-mentioned method (C) (properties of the iron oxide hydroxide particles obtained by separating a part of the reaction solution to precipitate particles therefrom and then washing the particles with water were as follows; average major axis diameter: 0.38 μm, average minor axis diameter: 0.063 μm, aspect ratio (major axis diameter/minor axis diameter): 6.2, BET specific surface area: 20.1 $m^2/g$, content of soluble sulfate: 5,780 ppm (calculated as $SO_4$) and content of soluble sodium salt: 2,560 ppm (calculated as Na)) were suspended in water to prepare 20 liters of a water suspension containing the iron oxide hydroxide particles in an amount of 50 g/liter. Next, the iron oxide hydroxide particles were sufficiently dispersed in the suspension using a high-speed dissolver and a vertical-type bead mill. At this time, the pH value of the suspension was 5.7.

20 liters of the suspension was mixed with 1,481 ml of 0.5 mol/liter aluminum acetate aqueous solution (corresponding to 2.0% by weight (calculated as Al) based on the weight of the yellow iron oxide hydroxide particles) and with 1,058 ml of a 1.4 mol/liter-ferrous sulfate aqueous solution (atomic ratio of Al to Fe added: ½). The suspension was heated to 80° C. while passing air therethrough at a feed rate of 70 liters per minute. Thereafter, the pH value of the suspension was adjusted to 4.3 and maintained for 3 hours, thereby depositing a composite oxide hydroxide of Al and Fe on surfaces of the iron oxide hydroxide particles.

Successively, the suspension was filtered using a press filter to separate a solid component therefrom. The solid component was sufficiently water-washed by passing water therethrough, thereby obtaining a wet cake of yellow iron oxide hydroxide particles.

A part of the thus obtained wet cake was dried at 120° C. for 24 hours, and then pulverized by a free crusher (M-2 model manufactured by NARA KIKAI SEISAKUSHO CO., LTD.). The obtained yellow iron oxide hydroxide (goethite) particles on which the composite oxide hydroxide of Al and Fe was deposited were subjected to fluorescent X-ray spectroscopy. As a result, it was determined that the yellow iron oxide hydroxide particles on which the composite oxide hydroxide of Al and Fe was deposited, had aluminum content of 1.86% by weight (calculated as Al) based on the weight of said iron oxide hydroxide as a core, iron content of 7.65% by weight (calculated as Fe) based on the weight of said iron oxide hydroxide as a core and Al/Fe atomic ratio of 0.503:1, and had an average major axis diameter of 0.38 μm, an average minor axis diameter of 0.064 μm, an aspect ratio (major axis diameter/minor axis diameter): 5.9, a BET specific surface area of 20.3 $m^2/g$ and a heat-resistance temperature of 272° C. With respect to the hue of the yellow iron oxide hydroxide particles on which the composite oxide hydroxide of Al and Fe was deposited, the L* value was 62.3; the a* value was 17.3; and the b* value was 51.1. Further, with respect to the change in hue from the iron oxide hydroxide particles as a starting material, ΔL* was +0.1; Δa* was +0.2; and Δb* was −0.2. The gloss of the yellow iron oxide hydroxide particles was 82%.

Example 2

The wet cake obtained in Example 1 was separated in water by using a agitator to prepare 20 liters of a water suspension containing the yellow iron oxide hydroxide particles on which the composite oxide hydroxide of Fe and Al was deposited, in an amount of 45 g/liter. The suspension was heated to 60° C. while stirring, and then mixed with a 0.1N-NaOH solution until the pH value of the suspension reached 10.5. While continuously stirring, the suspension was mixed with 1,000 ml of an aqueous solution containing sodium aluminate (NA-170 produced by SUMITOMO CHEMICAL INDUSTRY, CO., LTD.) in an amount of 0.5 mol/liter (corresponding to 1.5% by weight (calculated as Al) based on the weight of the yellow iron oxide hydroxide particles on which the composite oxide hydroxide of Fe and Al was deposited), and then maintained under the condition for 10 minutes. Thereafter, the suspension was mixed with a 1N-acetic acid aqueous solution until the pH value of the suspension reached 6.0, and then maintained under the condition for 30 minutes, thereby depositing a hydroxide of aluminum on the surfaces of the yellow iron oxide hydroxide particles on which the composite oxide hydroxide of Fe and Al was already deposited.

Successively, the suspension was filtered using a press filter to separate a solid component therefrom. The solid component was sufficiently water-washed while passing water therethrough to obtain a wet cake. The thus obtained wet cake was dried at 120° C. for 24 hours, and then pulverized by a free crusher (M-2 model manufactured by NARA KIKAI SEISAKUSHO CO., LTD.), thereby obtaining yellow iron oxide hydroxide particles on which the composite oxide hydroxide of Fe and Al and the hydroxide of aluminum were successively deposited.

The obtained yellow iron oxide hydroxide (goethite) particles were subjected to fluorescent X-ray spectroscopy. As a result, it was determined that the yellow iron oxide hydroxide particles on which the composite oxide hydroxide of Al and Fe and the hydroxide of aluminum were successively deposited, contained aluminum in an amount of 3.32% by weight (calculated as Al) based on the weight of the yellow iron oxide hydroxide particles. This showed that the content of aluminum in the hydroxide of aluminum was 1.46% by weight (calculated as Al) (3.32−1.86=1.46) based on the weight of the yellow iron oxide hydroxide particles. Also, the yellow iron oxide hydroxide particles on which the composite oxide hydroxide of Al and Fe and the hydroxide of aluminum were successively deposited, had an average major axis diameter of 0.39 μm, an average minor axis diameter of 0.064 μm, an aspect ratio (major axis diameter/minor axis diameter) of 6.1, a BET specific surface area of 19.3 m$^2$/g and a heat-resistance temperature of 284° C. With respect to the hue of the yellow iron oxide hydroxide particles on which the composite oxide hydroxide of Al and Fe and the hydroxide of aluminum were successively deposited, the L* value was 62.0; the a* value was 17.3; and the b* value was 51.6. Further, with respect to the change in hue from that of the initial iron oxide hydroxide particles, ΔL* was −0.2; Δa* was +0.2; and Δb* was +0.1. The gloss of the yellow iron oxide hydroxide particles was 87%.

<Kinds of Iron Oxide Hydroxide Particles>

As iron oxide hydroxide particles to be treated, there were prepared Particles 1 to 9 shown in Tables 1 and 6.

TABLE 1

| Kind of iron oxide hydroxide particles to be treated | Properties of iron oxide hydroxide particles to be treated | | | | |
|---|---|---|---|---|---|
| | Production method used | Shape | Average major axis diameter (μm) | Average minor axis diameter (μm) | Aspect ratio (−) |
| Particles 1 | (C) | Acicular | 0.39 | 0.063 | 6.2 |
| Particles 2 | (D) | Acicular | 0.36 | 0.061 | 5.9 |
| Particles 3 | (A) | Acicular | 0.43 | 0.058 | 7.4 |
| Particles 4 | (B) | Spindle-shaped | 0.32 | 0.054 | 5.9 |

| Kind of iron oxide hydroxide particles to be treated | Properties of iron oxide hydroxide particles to be treated | | | | |
|---|---|---|---|---|---|
| | BET specific surface area (m$^2$/g) | pH value | Hue | | |
| | | | L* value (−) | a* value (−) | b* value (−) |
| Particles 1 | 19.8 | 5.7 | 62.2 | 17.1 | 51.3 |
| Particles 2 | 22.5 | 4.8 | 59.1 | 18.6 | 48.7 |
| Particles 3 | 24.6 | 8.0 | 58.4 | 17.6 | 47.1 |
| Particles 4 | 29.5 | 6.6 | 57.0 | 18.8 | 46.1 |

Examples 3 to 7

The same procedure as defined in Example 1 was conducted except that kind of iron oxide hydroxide particles to be treated, concentration of iron oxide hydroxide particles in water suspension, pH values of the water suspension upon deposition of composite oxide hydroxide of Fe and Al, kind and amount of an aluminum compound added, kind and amount of an aqueous ferrous salt solution added, reaction temperature, pH value maintained, amount of air passed through the water suspension and reaction time, were changed variously, thereby depositing the composite oxide hydroxide of Fe and Al on surfaces of iron oxide hydroxide particles in the same manner as defined in Example 1.

The main production conditions used are shown in Table 2, and various properties of the obtained yellow iron oxide hydroxide particles are shown in Table 3.

TABLE 2

| Examples | Kind of iron oxide hydroxide to be treated | Concentration of water suspension (g/l) | Conditions of deposition of composite oxide hydroxide of Fe and Al (−) |
|---|---|---|---|
| | | | pH value before addition of Al and Fe compounds |
| Example 3 | Particles 1 | 50 | 6.0 |
| Example 4 | Particles 1 | 50 | 5.2 |
| Example 5 | Particles 2 | 50 | 5.8 |
| Example 6 | Particles 3 | 50 | 6.8 |
| Example 7 | Particles 4 | 50 | 8.6 |

| Examples | Conditions of deposition of composite oxide hydroxide of Fe and Al | | | |
|---|---|---|---|---|
| | Kind of Al compound added | Amount of Al compound added (calculated as Al) (% by weight) | Kind of aqueous ferrous salt solution added | Amount of ferrous salt added (calculated as Fe) (% by weight) |
| Example 3 | Aluminum acetate | 2.0 | ferrous sulfate | 8.3 |
| Example 4 | Aluminum sulfate | 0.5 | ferrous sulfate | 6.2 |
| Example 5 | Aluminum acetate | 1.5 | ferrous sulfate | 12.4 |
| Example 6 | Aluminum sulfate | 3.0 | ferrous sulfate | 6.2 |
| Example 7 | Sodium aluminate | 1.0 | ferrous sulfate | 8.3 |

| Examples | Conditions of deposition of composite oxide hydroxide of Fe and Al | | | |
|---|---|---|---|---|
| | Temperature (° C.) | pH maintained | Amount of air fed (1/min) | Time (hr) |
| Example 3 | 80 | 4.3 | 65 | 3.5 |
| Example 4 | 70 | 4.3 | 70 | 3.0 |
| Example 5 | 80 | 4.2 | 60 | 5.5 |
| Example 6 | 70 | 4.2 | 50 | 4.0 |
| Example 7 | 50 | 11.5 | 25 | 3.0 |

TABLE 3

| Examples | Properties of yellow iron oxide hydroxide particles on which composite oxide hydroxide of Fe and Al is deposited | | | | |
|---|---|---|---|---|---|
| | Average major axis diameter (μm) | Average minor axis diameter (μm) | Aspect ratio (−) | BET specific surface area (m$^2$/g) | Heat resistance (° C.) |
| Example 3 | 0.39 | 0.064 | 6.1 | 19.8 | 274 |
| Example 4 | 0.38 | 0.064 | 5.9 | 20.7 | 272 |
| Example 5 | 0.37 | 0.062 | 6.0 | 22.4 | 270 |
| Example 6 | 0.43 | 0.059 | 7.3 | 24.0 | 278 |
| Example 7 | 0.32 | 0.055 | 5.8 | 29.9 | 270 |

TABLE 3-continued

Properties of yellow iron oxide hydroxide particles on which composite oxide hydroxide of Fe and Al is deposited

| Examples | Theoretical atomic ratio Al/Fe in composite oxide hydroxide of Fe and Al | Measured atomic ratio Al/Fe in composite oxide hydroxide of Fe and Al | Composite oxide hydroxide of Fe and Al | |
|---|---|---|---|---|
| | | | Amount of Al deposited (calculated as Al) (% by weight) | Amount of Fe deposited (calculated as Fe) (% by weight) |
| Example 3 | 1/2 | 0.507 | 1.84 | 7.51 |
| Example 4 | 1/6 | 0.167 | 0.47 | 5.82 |
| Example 5 | 1/4 | 0.248 | 1.32 | 11.03 |
| Example 6 | 1/1 | 1.010 | 2.77 | 5.68 |
| Example 7 | 1/4 | 0.248 | 0.91 | 7.59 |

Properties of yellow iron oxide hydroxide particles on which composite oxide hydroxide of Fe and Al is deposited

| Examples | Hue | | | Change in hue | | | Gloss (%) |
|---|---|---|---|---|---|---|---|
| | L* value (−) | a* value (−) | b* value (−) | ΔL* value (−) | Δa* value (−) | Δb* value (−) | |
| Example 3 | 61.7 | 17.2 | 50.9 | −0.5 | +0.1 | −0.4 | 83 |
| Example 4 | 62.6 | 17.3 | 51.3 | +0.4 | +0.2 | 0.0 | 83 |
| Example 5 | 59.0 | 19.0 | 48.2 | −0.1 | +0.4 | −0.5 | 82 |
| Example 6 | 58.1 | 17.3 | 47.3 | −0.3 | −0.3 | +0.2 | 84 |
| Example 7 | 57.4 | 18.5 | 46.0 | +0.4 | −0.3 | −0.1 | 81 |

Examples 8 to 12

The same procedure as defined in Example 2 was conducted except that kind of yellow iron oxide hydroxide particles on which composite oxide hydroxide of Fe and Al was deposited, concentration of the composite oxide hydroxide-deposited yellow iron oxide hydroxide particles in the water suspension upon deposition of the hydroxide of aluminum, pH value of the water suspension before addition of the an aluminum compound, kind and amount of the aluminum compound added and final pH value of the water suspension, were changed variously, thereby obtaining yellow iron oxide hydroxide particles on which the composite oxide hydroxide of Fe and Al and the hydroxide of aluminum were successively deposited.

The main production conditions used are shown in Table 4, and various properties of the obtained yellow iron oxide hydroxide particles on which the composite oxide hydroxide of Fe and Al and the hydroxide of aluminum were successively deposited, are shown in Table 5.

TABLE 4

| Examples | Kind of yellow iron oxide hydroxide particles coated with composite oxide hydroxide of Fe and Al (Example No.) | Deposition of hydroxide of aluminum | |
|---|---|---|---|
| | | Concentration of water suspension (g/l) | pH value before addition of Al compound (−) |
| Example 8 | Example 1 | 45 | 3.3 |
| Example 9 | Example 2 | 45 | 10.1 |
| Example 10 | Example 3 | 45 | 10.8 |
| Example 11 | Example 4 | 45 | 4.0 |
| Example 12 | Example 5 | 45 | 11.0 |

TABLE 4-continued

| Examples | Deposition of hydroxide of aluminum | | |
|---|---|---|---|
| | Aluminum compound | | |
| | Kind of Al compound added | Amount of Al compound added (calculated as Al) (% by weight) | Final pH value |
| Example 8 | Aluminum acetate | 2.1 | 6.5 |
| Example 9 | Sodium aluminate | 1.1 | 6.5 |
| Example 10 | Sodium aluminate | 6.0 | 6.8 |
| Example 11 | Aluminum sulfate | 3.8 | 6.0 |
| Example 12 | Sodium aluminate | 0.4 | 7.0 |

TABLE 5

Properties of yellow iron oxide hydroxide particles on which composite oxide hydroxide of Fe and Al and hydroxide of aluminum were deposited

| Examples | Average major axis diameter (μm) | Average minor axis diameter (μm) | Aspect ratio (−) |
|---|---|---|---|
| Example 8 | 0.39 | 0.064 | 6.1 |
| Example 9 | 0.39 | 0.064 | 6.1 |
| Example 10 | 0.37 | 0.062 | 6.0 |
| Example 11 | 0.43 | 0.059 | 7.3 |
| Example 12 | 0.32 | 0.055 | 5.8 |

Properties of yellow iron oxide hydroxide particles on which composite oxide hydroxide of Fe and Al and hydroxide of aluminum were deposited

| Examples | BET specific surface area (m²/g) | Amount of hydroxide of aluminum deposited (calculated as Al) (% by weight) | Heat resistance (° C.) |
|---|---|---|---|
| Example 8 | 19.7 | 2.01 | 284 |
| Example 9 | 20.5 | 1.06 | 281 |
| Example 10 | 21.9 | 5.72 | 283 |
| Example 11 | 23.9 | 3.65 | 283 |
| Example 12 | 31.0 | 0.38 | 280 |

Properties of yellow iron oxide hydroxide particles on which composite oxide hydroxide of Fe and Al and hydroxide of aluminum were deposited

| Examples | Hue | | | Change in hue | | | Gloss (%) |
|---|---|---|---|---|---|---|---|
| | L* value (−) | a* value (−) | b* value (−) | ΔL* value (−) | Δa* value (−) | Δb* value (−) | |
| Example 8 | 62.1 | 16.9 | 51.5 | −0.1 | −0.2 | +0.2 | 87 |
| Example 9 | 62.4 | 17.1 | 51.2 | +0.2 | 0.0 | −0.1 | 89 |
| Example 10 | 58.8 | 18.4 | 49.0 | −0.3 | −0.2 | +0.3 | 91 |
| Example 11 | 58.7 | 17.4 | 47.0 | +0.3 | −0.2 | −0.1 | 93 |
| Example 12 | 57.0 | 18.8 | 46.2 | 0.0 | 0.0 | +0.1 | 86 |

Example 13

A wet cake (water-containing solid) of acicular iron oxide hydroxide (goethite) particles precipitated from an aqueous acid solution according to the above-mentioned method (C) (properties of the iron oxide hydroxide particles obtained by separating a part of the reaction solution to precipitate particles therefrom and then washing the particles with water were as follows; average major axis diameter: 0.38 μm, average minor axis diameter: 0.063 μm, aspect ratio (major axis diameter/minor axis diameter): 6.2, BET specific surface area: 20.1 m$^2$/g, content of soluble sulfate: 5,780 ppm (calculated as SO$_4$) and content of soluble sodium salt: 2,560 ppm (calculated as Na)) were suspended in water to prepare 20 liters of a water suspension containing the iron oxide hydroxide particles in an amount of 50 g/liter. Next, the iron oxide hydroxide particles were sufficiently dispersed in the suspension using a high-speed dissolver and a vertical-type bead mill. At this time, the pH value of the suspension was 5.7.

The thus obtained water suspension was heated to 80° C. while stirring. While continuously stirring, the water suspension was mixed with a 0.1N-sodium hydroxide aqueous solution until the pH value of the water suspension reached 11.2. Thereafter, the water suspension was maintained under the condition for 30 minutes.

The water suspension was filtered using a press filter to separate a solid component therefrom. The solid component was sufficiently water-washed while passing water therethrough. A part of the thus obtained wet cake was dried to obtain iron oxide hydroxide particles. The obtained iron oxide hydroxide particles had a soluble sulfate content of 235 ppm (calculated as SO$_4$), and a soluble sodium salt content of 1,221 ppm (calculated as Na).

The obtained wet cake (water-containing solid) was separated again in water to prepare a water suspension. After the concentration of yellow iron oxide hydroxide particles in the water suspension was adjusted to 50 g/liter, the water suspension was heated to 80° C. and mixed with a 1N acetic acid aqueous solution until the pH value of the water suspension reached 3.9. The water suspension was maintained under the condition for 30 minutes.

Using a press filter, the water suspension was filtered to separate a solid component therefrom. The solid component was sufficiently water-washed while passing water therethrough. A part of the thus obtained wet cake was dried to obtain high purity iron oxide hydroxide particles. The obtained high purity iron oxide hydroxide particles had a soluble sulfate content of 189 ppm (calculated as SO$_4$), a soluble sodium salt content of 81 ppm (calculated as Na), and a hue represented by L* value of 62.1, a* value of 17.2 and b* value of 51.8.

The obtained wet cake was separated again in water by using an agitator to adjust the concentration of the high purity iron oxide hydroxide in the water suspension to 45 g/liter. 20 liters of the resultant suspension having a pH value of 5.1 was mixed with 667 ml of a 0.5 mol/liter-aluminum acetate aqueous solution (corresponding to 1.0% by weight (calculated as Al) based on the weight of the high purity iron oxide hydroxide particles) and with 952 ml of a 1.4 mol/liter-ferrous sulfate aqueous solution (atomic ratio of Al to Fe added: ¼). The water suspension was heated to 80° C. while passing air therethrough at a feed rate of 65 liters per minute. Thereafter, the pH value of the suspension was adjusted to 4.3 and maintained under this condition for 3 hours, thereby depositing a composite oxide hydroxide of Al and Fe on surfaces of the high purity iron oxide hydroxide particles.

Successively, the water suspension was filtered using a press filter to separate a solid component therefrom. The solid component was sufficiently water-washed while passing water therethrough, thereby obtaining a wet cake of high purity yellow iron oxide hydroxide particles.

A part of the thus obtained wet cake was dried to obtain high purity yellow iron oxide hydroxide (goethite) particles on which the composite oxide hydroxide of Al and Fe was deposited. As a result of fluorescent X-ray spectroscopy, it was determined that the high purity yellow iron oxide hydroxide particles on which the composite oxide hydroxide of Al and Fe was deposited, had aluminum content of 1.02% by weight (calculated as Al) based on the weight of said iron oxide hydroxide as a core, iron content of 8.34% by weight (calculated as Fe) based on the weight of said iron oxide hydroxide as a core and Al/Fe atomic ratio of 0.253:1, and had an average major axis diameter of 0.39 μm, an average minor axis diameter of 0.065 am, an aspect ratio (major axis diameter/minor axis diameter) of 6.0, a BET specific surface area of 18.9 m$^2$/g, a soluble sulfate content of 211 ppm (calculated as SO$_4$), a soluble sodium salt content of 63 ppm (calculated as Na) and a heat-resistance temperature of 285° C. With respect to the hue of the high purity yellow iron oxide hydroxide particles on which the composite oxide hydroxide of Al and Fe was deposited, the L* value was 62.3; the a* value was 17.3; and the b* value was 52.0. Further, with respect to the change in hue from that of the initial iron oxide hydroxide particles, ΔL* was +0.2; Δa* was +0.1; and Δb* was +0.2. The gloss of the obtained high purity yellow iron oxide hydroxide particles was 89%.

Example 14

The wet cake obtained in Example 13 was separated in water by using an agitator to prepare 20 liters of a water suspension containing the high purity yellow iron oxide hydroxide particles on which the composite oxide hydroxide of Fe and Al was deposited, in an amount of 40 g/liter. The suspension was heated to 80° C., and then mixed with a 0.1N-NaOH solution until the pH value of the suspension reached 10.5. While continuously stirring, the suspension was mixed with 593 ml of an aqueous solution containing sodium aluminate (NA-170 produced by SUMITOMO CHEMICAL INDUSTRY, CO., LTD.) in an amount of 0.5 mol/liter (corresponding to 1.0% by weight (calculated as Al) based on the weight of the high purity yellow iron oxide hydroxide particles on which the composite oxide hydroxide of Fe and Al was deposited), and then maintained under this condition for 10 minutes. Thereafter, the suspension was mixed with a 1N-acetic acid aqueous solution until the pH value of the suspension reached 6.0, and then maintained under this condition for 30 minutes, thereby further precipitating and depositing a hydroxide of aluminum on the surfaces of the high purity yellow iron oxide hydroxide particles on which the composite oxide hydroxide of Fe and Al was already deposited.

Successively, the suspension was filtered using a press filter to separate a solid component therefrom. The solid component was sufficiently water-washed while passing water therethrough to obtain a wet cake. The thus obtained wet cake was dried at 120° C. for 24 hours, and then pulverized by a free crusher (M-2 model manufactured by NARA KIKAI SEISAKUSHO CO., LTD.), thereby obtaining high purity yellow iron oxide hydroxide particles on which the composite oxide hydroxide of Fe and Al and the hydroxide of aluminum were successively deposited.

The obtained high purity yellow iron oxide hydroxide (goethite) particles were subjected to fluorescent X-ray spectroscopy. As a result, it was determined that the high purity yellow iron oxide hydroxide particles on which the composite oxide hydroxide of Al and Fe and the hydroxide of aluminum were successively deposited, contained aluminum in an amount of 1.99% by weight (calculated as Al).

This showed that the content of aluminum in the hydroxide of aluminum deposited was 0.97% by weight (calculated as Al) (1.99−1.02=0.97). Also, it was determined that the high purity yellow iron oxide hydroxide particles on which the composite oxide hydroxide of Al and Fe and the hydroxide of aluminum were successively deposited, had an average major axis diameter of 0.39 μm, an average minor axis diameter of 0.065 μm, a BET specific surface area of 18.9 m²/g, a soluble sulfate content of 175 ppm (calculated as $SO_4$), a soluble sodium salt content of 75 ppm (calculated as Na) and a heat-resistance temperature of 294° C. With respect to the hue of the high purity yellow iron oxide hydroxide particles on which the composite oxide hydroxide of Al and Fe and the hydroxide of aluminum were successively deposited, the L* value was 61.9; the a* value was 17.4; and the b* value was 52.1. Further, with respect to the change in hue from that of the initial iron oxide hydroxide particles, ΔL* was −0.2; Δa* was +0.2; and Δb* was +0.3. The gloss of the high purity yellow iron oxide hydroxide particles was 96%.

Examples 15 to 19

The same procedure for high purification as defined in Example 13 was conducted except that kind of iron oxide hydroxide particles to be treated, concentration of iron oxide hydroxide particles in a water suspension, pH value when treated with an aqueous alkaline solution, heating temperature and time when treated with the aqueous alkaline solution, pH value when treated with an aqueous acid solution, and heating temperature and time when treated with the aqueous acid solution, were changed variously, thereby performing a high purification treatment in the same manner as defined in Example 13.

The main production conditions used and various properties of the obtained high purity iron oxide hydroxide particles are shown in Table 6.

Next, the same procedure for deposition of composite oxide hydroxide as defined in Example 13 was conducted except that kind of high purity iron oxide hydroxide particles used, concentration of high purity iron oxide hydroxide particles in a water suspension, pH value of the water suspension upon deposition of composite oxide hydroxide of Fe and Al, kind and amount of an aluminum compound added, kind and amount of an aqueous ferrous salt solution added, reaction temperature, pH value maintained, amount of air passed through the water suspension and reaction time, were changed variously, thereby depositing composite oxide hydroxide of Fe and Al on surfaces of high purity iron oxide hydroxide particles in the same manner as in Example 13.

The main production conditions used are shown in Table 7, and various properties of the obtained high purity yellow iron oxide hydroxide particles on which the composite oxide hydroxide of Fe and Al was deposited, are shown in Table 8.

TABLE 6

| Kind of high purity iron oxide hydroxide particles | Kind of iron oxide hydroxide particles to be treated | Concentration of water suspension (g/l) | High purification treatment A | | |
|---|---|---|---|---|---|
| | | | pH value (−) | Heating temperature (° C.) | Heating time (min) |
| Particles 5 | Particles 1 | 50 | 11.0 | 80 | 60 |
| Particles 6 | Particles 1 | 50 | 3.8 | 80 | 60 |
| Particles 7 | Particles 2 | 50 | 3.6 | 80 | 30 |
| Particles 8 | Particles 3 | 50 | 11.8 | 60 | 30 |
| Particles 9 | Particles 4 | 50 | 10.6 | 80 | 90 |

| Kind of high purity iron oxide hydroxide particles | High purification treatment A | | High purification treatment B | | |
|---|---|---|---|---|---|
| | Contents of soluble Na salt and soluble $SO_4$ in iron oxide hydroxide particles treated | | | | |
| | S—Na (ppm) | S—$SO_4$ (ppm) | pH value (−) | Heating temperature (° C.) | Heating time (min) |
| Particles 5 | 1,365 | 268 | 3.5 | 80 | 60 |
| Particles 6 | 78 | 2,186 | 12.0 | 80 | 60 |
| Particles 7 | 118 | 2,438 | 11.6 | 80 | 30 |
| Particles 8 | 1,865 | 76 | 3.4 | 60 | 30 |
| Particles 9 | 2,980 | 117 | 3.8 | 60 | 120 |

| Kind of high purity iron oxide hydroxide particles | High purification treatment B | | High purity iron oxide hydroxide particles (before treatment) | | |
|---|---|---|---|---|---|
| | Contents of soluble Na salt and soluble $SO_4$ in iron oxide hydroxide particles treated | | Hue | | |
| | S—Na (ppm) | S—$SO_4$ (ppm) | L* value (−) | a* value (−) | b* value (−) |
| Particles 5 | 118 | 296 | 61.9 | 17.0 | 51.6 |
| Particles 6 | 106 | 188 | 62.3 | 17.3 | 52.1 |
| Particles 7 | 126 | 253 | 59.3 | 18.4 | 49.1 |
| Particles 8 | 138 | 106 | 58.5 | 17.0 | 47.6 |
| Particles 9 | 65 | 142 | 56.5 | 18.6 | 45.9 |

TABLE 7

| Examples | Kind of high purity iron oxide hydroxide particles to be treated | Concentration of water suspension (g/l) | Condition of deposition of composite oxide hydroxide of Fe and Al |
|---|---|---|---|
| | | | pH value before addition of Fe and Al compounds (−) |
| Example 15 | Particles 5 | 45 | 5.1 |
| Example 16 | Particles 6 | 45 | 5.3 |
| Example 17 | Particles 7 | 45 | 6.1 |
| Example 18 | Particles 8 | 45 | 7.0 |
| Example 19 | Particles 9 | 45 | 8.8 |

| Examples | Conditions of deposition of composite oxide hydroxide of Fe and Al | | | |
|---|---|---|---|---|
| | Kind of Al compound added | Amount of Al compound added (calculated as Al) (% by weight) | Kind of aqueous ferrous salt solution added | Amount of ferrous salt added (calculated as Fe) (% by weight) |
| Example 15 | Aluminum acetate | 0.5 | ferrous sulfate | 4.1 |
| Example 16 | Aluminum acetate | 1.5 | ferrous sulfate | 12.4 |
| Example 17 | Aluminum sulfate | 3.0 | ferrous sulfate | 12.4 |

TABLE 7-continued

| Examples | | | | |
|---|---|---|---|---|
| Example 18 | Aluminum sulfate | 5.0 | ferrous sulfate | 10.3 |
| Example 19 | Sodium aluminate | 1.0 | ferrous sulfate | 8.3 |

Conditions of deposition of composite oxide hydroxide of Fe and Al

| Examples | Reaction Temperature (° C.) | pH value maintained (-) | Amount of air fed (l/min) | Reaction time (hr) |
|---|---|---|---|---|
| Example 15 | 80 | 4.3 | 65 | 3.0 |
| Example 16 | 80 | 4.3 | 65 | 3.0 |
| Example 17 | 60 | 4.1 | 40 | 6.0 |
| Example 18 | 60 | 4.1 | 40 | 4.5 |
| Example 19 | 40 | 12.0 | 20 | 10.0 |

TABLE 8

Properties of high purity yellow iron oxide hydroxide particles on which composite oxide hydroxide of Fe and Al

| Examples | Average major axis diameter (μm) | Average minor axis diameter (μm) | Aspect ratio (-) |
|---|---|---|---|
| Example 15 | 0.39 | 0.065 | 6.0 |
| Example 16 | 0.38 | 0.064 | 5.9 |
| Example 17 | 0.37 | 0.062 | 6.0 |
| Example 18 | 0.44 | 0.060 | 7.3 |
| Example 19 | 0.33 | 0.055 | 6.0 |

Properties of high purity yellow iron oxide hydroxide particles on which composite oxide hydroxide of Fe and Al

| Examples | BET specific surface area (m²/g) | Content of soluble Na salt (ppm) | Content of soluble SO₄ (ppm) | Heat resistance (° C.) |
|---|---|---|---|---|
| Example 15 | 19.6 | 138 | 265 | 286 |
| Example 16 | 21.8 | 101 | 183 | 284 |
| Example 17 | 22.6 | 136 | 282 | 283 |
| Example 18 | 23.6 | 142 | 86 | 282 |
| Example 19 | 29.8 | 98 | 116 | 281 |

Properties of high purity yellow iron oxide hydroxide particles on which composite oxide hydroxide of Fe and Al

| Examples | Theoretical atomic ratio Al/Fe in composite oxide hydroxide of Fe and Al (-) | Measured atomic ratio Al/Fe in composite oxide hydroxide of Fe and Al (-) | Composite oxide hydroxide of Fe and Al Amount of Al deposited (calculated as Al) (% by weight) | Amount of Fe deposited (calculated as Fe) (% by weight) |
|---|---|---|---|---|
| Example 15 | 1/4 | 0.259 | 0.49 | 3.91 |
| Example 16 | 1/4 | 0.247 | 1.30 | 10.88 |
| Example 17 | 1/2 | 0.496 | 2.58 | 10.76 |
| Example 18 | 1/1 | 1.004 | 4.33 | 8.93 |
| Example 19 | 1/4 | 0.250 | 0.91 | 7.55 |

TABLE 8-continued

Properties of high purity yellow iron oxide hydroxide particles on which composite oxide hydroxide of Fe and Al

| | Hue | | | Change in hue | | | |
|---|---|---|---|---|---|---|---|
| Examples | L* value (-) | a* value (-) | b* value (-) | ΔL* value (-) | Δa* value (-) | Δb* value (-) | Gloss (%) |
| Example 15 | 61.6 | 17.2 | 51.2 | -0.3 | +0.2 | -0.4 | 91 |
| Example 16 | 62.5 | 17.6 | 51.8 | +0.3 | +0.3 | -0.3 | 92 |
| Example 17 | 58.9 | 18.5 | 48.9 | -0.4 | +0.1 | -0.2 | 90 |
| Example 18 | 58.4 | 16.5 | 47.1 | -0.1 | -0.5 | -0.5 | 88 |
| Example 19 | 57.0 | 18.7 | 46.2 | +0.5 | +0.1 | +0.3 | 86 |

Examples 20 to 24

The same procedure as defined in Example 14 was conducted except that kind of high purity yellow iron oxide hydroxide particles on which composite oxide hydroxide of Fe and Al was deposited, concentration of the composite oxide hydroxide-deposited high purity yellow iron oxide hydroxide particles in a water suspension upon deposition of hydroxide of aluminum, pH value of the water suspension before addition of an aluminum compound, kind and amount of the aluminum compound added, and final pH value of the water suspension, were changed variously, thereby obtaining high purity yellow iron oxide hydroxide particles on which the composite oxide hydroxide of Fe and Al and the hydroxide of aluminum were successively deposited.

The main production conditions used are shown in Table 9, and various properties of the obtained high purity yellow iron oxide hydroxide particles on which the composite oxide hydroxide of Fe and Al and the hydroxide of aluminum were successively deposited, are shown in Table 10.

TABLE 9

| Examples | Kind of high purity yellow iron oxide hydroxide particles on which composite oxide hydroxide of Fe and Al is deposited (Example No.) | Deposition of hydroxide of aluminum | |
|---|---|---|---|
| | | Concentration of water suspension (g/l) | pH value before addition of Al compound (-) |
| Example 20 | Example 6 | 40 | 3.6 |
| Example 21 | Example 7 | 40 | 10.5 |
| Example 22 | Example 8 | 40 | 11.2 |
| Example 23 | Example 9 | 40 | 3.8 |
| Example 24 | Example 10 | 40 | 10.8 |

Deposition of hydroxide of aluminum

| | Aluminum compound | | |
|---|---|---|---|
| Examples | Kind of Al compound added | Amount of Al compound added (calculated as Al) (% by weight) | Final pH value (-) |
| Example 20 | Aluminum acetate | 1.6 | 6.0 |
| Example 21 | Sodium aluminate | 3.3 | 7.0 |

TABLE 9-continued

| | | | |
|---|---|---|---|
| Example 22 | Sodium aluminate | 5.2 | 7.3 |
| Example 23 | Aluminum sulfate | 0.5 | 6.5 |
| Example 24 | Sodium aluminate | 3.1 | 7.7 |

TABLE 10

Properties of high purity yellow iron oxide hydroxide particles on which composite oxide hydroxide of Fe and Al and hydroxide of aluminum were deposited

| Examples | Average major axis diameter ($\mu$m) | Average minor axis diameter ($\mu$m) | Aspect ratio (-) | BET specific surface area (m$^2$/g) |
|---|---|---|---|---|
| Example 20 | 0.39 | 0.065 | 6.0 | 19.8 |
| Example 21 | 0.39 | 0.064 | 6.1 | 20.6 |
| Example 22 | 0.37 | 0.062 | 6.0 | 21.8 |
| Example 23 | 0.44 | 0.060 | 7.3 | 24.1 |
| Example 24 | 0.33 | 0.055 | 6.0 | 32.1 |

Properties of high purity yellow iron oxide hydroxide particles on which composite oxide hydroxide of Fe and Al and hydroxide of aluminum were deposited

| Examples | Amount of hydroxide of aluminum deposited (calculated as Al) (% by weight) | Content of soluble Na salt (ppm) | Content of soluble SO$_4$ (ppm) | Heat resistance (° C.) |
|---|---|---|---|---|
| Example 20 | 1.58 | 78 | 271 | 296 |
| Example 21 | 3.16 | 121 | 68 | 301 |
| Example 22 | 4.96 | 144 | 98 | 293 |
| Example 23 | 0.43 | 86 | 103 | 291 |
| Example 24 | 3.01 | 111 | 56 | 290 |

Properties of high purity yellow iron oxide hydroxide particles on which composite oxide hydroxide of Fe and Al and hydroxide of aluminum were deposited

| | Hue | | | Change in hue | | | |
|---|---|---|---|---|---|---|---|
| Examples | L* value (-) | a* value (-) | b* value (-) | ΔL* value (-) | Δa* value (-) | Δb* value (-) | Gloss (%) |
| Example 20 | 61.6 | 17.2 | 51.4 | −0.3 | +0.2 | −0.2 | 96 |
| Example 21 | 62.6 | 17.5 | 52.0 | +0.3 | +0.2 | −0.1 | 98 |
| Example 22 | 59.0 | 18.4 | 49.0 | −0.3 | 0.0 | −0.1 | 100 |
| Example 23 | 58.6 | 17.0 | 47.4 | +0.1 | 0.0 | −0.2 | 101 |
| Example 24 | 56.7 | 18.8 | 46.2 | +0.2 | +0.2 | +0.3 | 95 |

Comparative Example 1

The same iron oxide hydroxide particles as those used in Example 1, were used in this Comparative Example, but were subjected to neither deposition nor purification treatments according to the present invention. Various properties of the non-treated iron oxide hydroxide particles were measured by the same methods as defined above. The results of the measurements are shown in Table 11.

As shown in Table 11, the iron oxide hydroxide particles obtained through respective steps of precipitation from the reaction solution, filtering-out, washing with water and drying, were deteriorated in heat resistance.

Comparative Example 2

The same iron oxide hydroxide particles as those used in Example 1, were also used as raw particles, but none of heat-treatment in an aqueous alkaline solution, heat-treatment in an aqueous acid solution and deposition of composite oxide hydroxide of Fe and Al were conducted. Using the non-treated iron oxide hydroxide particles, the same procedure for deposition of hydroxide of aluminum as defined above was conducted except that the concentration of iron oxide hydroxide particles in a water suspension was adjusted to 50 g/liter, the amount of sodium aluminate added was 2.68% by weight (calculated as Al) the pH value of the water suspension before addition of the aluminum compound was adjusted to 10.0, and the final pH value of the water suspension was adjusted to 7.0, thereby obtaining yellow iron oxide hydroxide particles on which the hydroxide of aluminum was deposited.

Various properties of the obtained yellow iron oxide hydroxide particles on which only the hydroxide of aluminum was deposited, are shown in Table 11.

As shown in Table 11, the yellow iron oxide hydroxide particles on which only the hydroxide of aluminum was deposited, were still unsatisfactory in heat resistance.

Comparative Example 3

The same iron oxide hydroxide particles as used in Example 1, were used to prepare a water suspension containing the iron oxide hydroxide particles in an amount of 50 g/liter. 20 liters of the suspension (corresponding to a solid content of 1 kg) was mixed with a 13N-NaOH solution to adjust the pH value of the suspension to 13.0. 700 ml of the suspension was separated and placed in a one-liter autoclave (manufactured by TOYO KOATSU CO., LTD.). While stirring, the suspension was heated to 220° C. and maintained at that temperature for 30 minutes, followed by cooling. The suspension was taken out of the autoclave and sufficiently washed with water by decantation until filtrate therefrom became neutral. Next, a wet cake was filtered out using Nutsche, dried at 120° C. for 24 hours and then pulverized to obtain iron oxide hydroxide particles.

Various properties of the obtained iron oxide hydroxide particles are shown in Table 11.

As shown in Table 11, the obtained iron oxide hydroxide particles exhibited large change in hue between before and after the heat resistance-improving treatment.

Reference Example 1

The same iron oxide hydroxide particles as used in Example 1, were used to prepare a water suspension containing the iron oxide hydroxide particles in an amount of 50 g/liter. 20 liters of the suspension (corresponding to a solid content of 1 kg) was added to 2 liters of an aqueous solution containing 156.4 g of aluminum sulfate, and intimately mixed together. 700 ml of the suspension was separated and placed in a one-liter autoclave (manufactured by TOYO KOATSU CO., LTD.). While stirring, the suspension was heated to 220° C. and maintained at that temperature for 30 minutes, followed by cooling. The suspension was taken out of the autoclave and filtered using Nutsche to separate a filter cake therefrom. The filter cake was sufficiently washed with water until filtrate thereof became neutral. The obtained wet cake was dried at 120° C. for 24 hours and then pulverized, thereby obtaining iron oxide hydroxide particles.

Various properties of the obtained iron oxide hydroxide particles are shown in Table 11.

As shown in Table 11, the obtained iron oxide hydroxide particles exhibited large change in hue between before and after the heat resistance-improving treatment.

Reference Example 2

The same iron oxide hydroxide particles as used in Example 1, were used to prepare a water suspension containing the iron oxide hydroxide particles in an amount of 46.7 g/l. The suspension was mixed with a 6N-NaOH solution to adjust the pH value of the suspension to 13.0. 700 ml of the suspension (corresponding to a solid content of 32.7 g) was separated and placed in a one-liter autoclave (manufactured by TOYO KOATSU CO., LTD.). While stirring, the suspension was heated to 180° C. and maintained at that temperature for 120 minutes, followed by cooling. The suspension was taken out of the autoclave and mixed with 4.32 g of sodium aluminate (NA-170 produced by SUMITOMO CHEMICAL INDUSTRY, CO., LTD.). Further, diluted sulfuric acid was gradually added to the suspension to adjust the pH value of the suspension to 6.0. The suspension was sufficiently washed with water by decantation and then a filter cake was filtered out using Nutsche. The obtained wet cake was dried at 120° C. for 24 hours and then pulverized, thereby obtaining yellow iron oxide hydroxide particles.

Various properties of the obtained yellow iron oxide hydroxide particles are shown in Table 11.

As shown in Table 11, the obtained yellow iron oxide hydroxide particles exhibited large change in hue between before and after the heat resistance-improving treatment.

Reference Example 3

The same iron oxide hydroxide particles as used in Example 1, were used to prepare a water suspension containing the iron oxide hydroxide particles in an amount of 46.7 g/liter. The suspension was mixed with a 6N-NaOH solution to adjust the pH value of the suspension to 12.0. 700 ml of the suspension (corresponding to a solid content of 32.7 g) was separated, mixed with an aqueous solution containing 2.87 g of sodium aluminate (NA-170 produced by SUMITOMO CHEMICAL INDUSTRY, CO., LTD.) and then placed in a one-liter autoclave (manufactured by TOYO KOATSU CO., LTD.). While stirring, the suspension was heated to 180° C. and hydrothermally treated at that temperature for 60 minutes, followed by cooling. The suspension was taken out of the autoclave, sufficiently washed with water by decantation and then filtered using Nutsche to separate a filter cake therefrom. The obtained wet cake was dried at 120° C. for 4 hours and then pulverized, thereby obtaining yellow iron oxide hydroxide particles.

Various properties of the obtained yellow iron oxide hydroxide particles are shown in Table 11.

As shown in Table 11, the obtained yellow iron oxide hydroxide particles exhibited large change in hue between before and after the heat resistance-improving treatment.

TABLE 11

| Comparative Examples | Properties of iron oxide hydroxide particles | | | |
|---|---|---|---|---|
| | Average major axis diameter (μm) | Average minor axis diameter (μm) | Aspect ratio (–) | BET specific surface area (m²/g) |
| Comparative Example 1 | 0.38 | 0.063 | 6.0 | 19.9 |
| Comparative Example 2 | 0.38 | 0.063 | 6.0 | 22.0 |
| Comparative Example 3 | 0.37 | 0.064 | 5.8 | 17.6 |
| Reference Example 1 | 0.37 | 0.065 | 5.7 | 19.3 |
| Reference Example 2 | 0.38 | 0.064 | 5.9 | 20.5 |
| Reference Example 3 | 0.35 | 0.060 | 5.8 | 16.1 |

| Comparative Examples | Properties of iron oxide hydroxide particles | | |
|---|---|---|---|
| | Content of soluble Na salt (ppm) | Content of soluble SO₄ (ppm) | Heat resistance (° C.) |
| Comparative Example 1 | 2,783 | 2,876 | 206 |
| Comparative Example 2 | 2,181 | 2,282 | 231 |
| Comparative Example 3 | 1,110 | 215 | 253 |
| Reference Example 1 | 87 | 1,888 | 260 |
| Reference Example 2 | 1,076 | 326 | 263 |
| Reference Example 3 | 1,596 | 483 | 265 |

| Comparative Examples | Properties of iron oxide hydroxide particles | | | | | | |
|---|---|---|---|---|---|---|---|
| | Hue | | | Change in hue | | | |
| | $L^*$ value (–) | $a^*$ value (–) | $b^*$ value (–) | $\Delta L^*$ value (–) | $\Delta a^*$ value (–) | $\Delta b^*$ value (–) | Gloss (%) |
| Comparative Example 1 | 62.2 | 17.1 | 51.2 | — | — | — | 53 |
| Comparative Example 2 | 61.7 | 17.6 | 51.1 | −0.5 | +0.5 | −0.1 | 65 |
| Comparative Example 3 | 60.1 | 19.7 | 50.0 | −2.1 | +2.6 | −1.2 | 71 |
| Reference Example 1 | 59.9 | 19.0 | 48.6 | −2.3 | +1.9 | −2.6 | 74 |
| Reference Example 2 | 60.6 | 18.1 | 49.7 | −1.6 | +1.0 | −1.5 | 78 |
| Reference Example 3 | 60.9 | 18.1 | 49.7 | −1.3 | +1.0 | −1.5 | 78 |

Examples 25 to 44, Comparative Examples 4 to 6 and Reference Examples 4 to 6

Using yellow pigments containing the yellow iron oxide hydroxide particles obtained in Examples 3 to 12 and 15 to 24, solvent-based paints were produced in the same manner as the production method described hereinbefore with respect to measurements of hue and gloss.

The main production conditions and various properties of the obtained paints are shown in Table 12 and 13.

TABLE 12

| | Production of solvent-based paint | | | Properties of solvent-based paint |
|---|---|---|---|---|
| Examples | Kinds of yellow iron oxide hydroxide particles (Example No.) | Kinds of resins | | Viscosity (cP) |
| Example 25 | Example 3 | Amino-alkyd resin | | 2,611 |
| Example 26 | Example 4 | Amino-alkyd resin | | 2,867 |

TABLE 12-continued

| Example | | | |
|---|---|---|---|
| Example 27 | Example 5 | Amino-alkyd resin | 2,764 |
| Example 28 | Example 6 | Amino-alkyd resin | 2,534 |
| Example 29 | Example 7 | Amino-alkyd resin | 2,278 |
| Example 30 | Example 15 | Amino-alkyd resin | 2,509 |
| Example 31 | Example 16 | Amino-alkyd resin | 2,458 |
| Example 32 | Example 17 | Amino-alkyd resin | 2,406 |
| Example 33 | Example 18 | Amino-alkyd resin | 2,586 |
| Example 34 | Example 19 | Amino-alkyd resin | 2,099 |
| Example 35 | Example 8 | Amino-alkyd resin | 2,432 |
| Example 36 | Example 9 | Amino-alkyd resin | 2,381 |
| Example 37 | Example 10 | Amino-alkyd resin | 2,329 |
| Example 38 | Example 11 | Amino-alkyd resin | 2,253 |
| Example 39 | Example 12 | Amino-alkyd resin | 2,125 |
| Example 40 | Example 20 | Amino-alkyd resin | 2,381 |
| Example 41 | Example 21 | Amino-alkyd resin | 2,342 |
| Example 42 | Example 22 | Amino-alkyd resin | 2,240 |
| Example 43 | Example 23 | Amino-alkyd resin | 2,189 |
| Example 44 | Example 24 | Amino-alkyd resin | 1,997 |

| | Properties of coating film | | |
|---|---|---|---|
| | Gloss (%) | | Heat-resisting |
| Examples | Dispersing time of mill base: 45 min. | Dispersing time of mill base: 90 min. | temperature of coating film (° C.) |
| Example 25 | 83 | 87 | 274 |
| Example 26 | 84 | 88 | 275 |
| Example 27 | 82 | 89 | 271 |
| Example 28 | 81 | 86 | 278 |
| Example 29 | 84 | 88 | 279 |
| Example 30 | 86 | 91 | 283 |
| Example 31 | 87 | 93 | 284 |
| Example 32 | 86 | 94 | 287 |
| Example 33 | 86 | 92 | 284 |
| Example 34 | 88 | 91 | 286 |
| Example 35 | 87 | 93 | 283 |
| Example 36 | 89 | 93 | 283 |
| Example 37 | 88 | 93 | 285 |
| Example 38 | 86 | 94 | 286 |
| Example 39 | 88 | 94 | 289 |
| Example 40 | 91 | 98 | 293 |
| Example 41 | 93 | 97 | 295 |
| Example 42 | 95 | 98 | 298 |
| Example 43 | 94 | 99 | 293 |
| Example 44 | 98 | 103 | 303 |

| | Properties of coating film Hue | | |
|---|---|---|---|
| Examples | L* value (—) | a* value (—) | b* value (—) |
| Example 25 | 61.6 | 17.5 | 51.4 |
| Example 26 | 63.0 | 17.4 | 51.8 |
| Example 27 | 59.9 | 18.9 | 49.6 |
| Example 28 | 58.4 | 17.2 | 49.2 |
| Example 29 | 58.6 | 18.2 | 48.6 |
| Example 30 | 62.3 | 17.6 | 52.3 |
| Example 31 | 63.1 | 17.8 | 52.4 |
| Example 32 | 59.6 | 18.3 | 50.1 |
| Example 33 | 58.9 | 16.5 | 48.1 |
| Example 34 | 58.1 | 18.9 | 47.3 |
| Example 35 | 62.6 | 16.7 | 52.2 |
| Example 36 | 63.1 | 17.6 | 52.3 |
| Example 37 | 59.2 | 18.3 | 49.6 |
| Example 38 | 59.1 | 17.3 | 48.6 |
| Example 39 | 57.3 | 18.5 | 47.2 |
| Example 40 | 61.9 | 17.4 | 51.9 |
| Example 41 | 63.1 | 17.4 | 53.6 |
| Example 42 | 61.0 | 18.2 | 50.6 |
| Example 43 | 59.3 | 17.5 | 47.7 |
| Example 44 | 57.2 | 18.6 | 47.3 |

TABLE 13

| | Production of solvent-based paint | | |
|---|---|---|---|
| Comparative Examples | Kinds of iron oxide hydroxide particles (Comparative Example No.) | Kinds of resins | Properties of solvent-based paint Viscosity (cP) |
| Comparative Example 4 | Comparative Example 1 | Amino-alkyd resin | 2,560 |
| Comparative Example 5 | Comparative Example 2 | Amino-alkyd resin | 3,098 |
| Comparative Example 6 | Comparative Example 3 | Amino-alkyd resin | 2,970 |
| Reference Example 4 | Reference Example 1 | Amino-alkyd resin | 2,586 |
| Reference Example 5 | Reference Example 2 | Amino-alkyd resin | 2,304 |
| Reference Example 6 | Reference Example 3 | Amino-alkyd resin | 2,432 |

| | Properties of coating film | | |
|---|---|---|---|
| | Gloss (%) | | Heat-resisting |
| Comparative Examples | Dispersing time of mill base: 45 min. | Dispersing time of mill base: 90 min. | temperature of coating film (° C.) |
| Comparative Example 4 | 68 | 81 | 210 |
| Comparative Example 5 | 78 | 84 | 235 |
| Comparative Example 6 | 76 | 82 | 250 |
| Reference Example 4 | 75 | 80 | 256 |
| Reference Example 5 | 76 | 83 | 265 |
| Reference Example 6 | 78 | 84 | 260 |

| | Properties of coating film Hue | | |
|---|---|---|---|
| Comparative Examples | L* value (—) | a* value (—) | b* value (—) |
| Comparative Example 4 | 63.1 | 17.0 | 52.1 |
| Comparative Example 5 | 62.5 | 17.8 | 51.6 |
| Comparative Example 6 | 61.0 | 19.6 | 50.5 |
| Reference Example 4 | 60.3 | 19.5 | 49.1 |

TABLE 13-continued

| | | | |
|---|---|---|---|
| Reference Example 5 | 61.0 | 18.6 | 49.3 |
| Reference Example 6 | 61.3 | 18.3 | 49.8 |

Example 45

<Production of Water-based Paint>

7.62 g of pigment particles composed of yellow iron oxide hydroxide particles obtained in Example 3 was charged together with other components shown below into 140 ml glass bottle. These components were intimately mixed and dispersed together with 90 g of 3 mmφ glass beads by a paint shaker for 45 minutes to prepare a mill base.

| Composition of mill base: | |
|---|---|
| Pigment particles (yellow iron oxide hydroxide particles) | 12.4 parts by weight |
| Water-soluble alkyd resin (Tradename: S-118 produced by DAI-NIPPON INK KAGAKU KOGYO CO., LTD.) | 9.0 parts by weight |
| Antifoaming agent | 0.1 part by weight |
| Water | 4.8 parts by weight |
| Butyl Cellosolve | 4.1 parts by weight |

The thus obtained mill base and the other components shown below were blended together, and further intimately mixed and dispersed by a paint shaker for 15 minutes to prepare a water-based paint.

| Composition of water-based paint: | |
|---|---|
| Mill base (prepared above) | 30.4 parts by weight |
| Water-soluble alkyd resin (Tradename: S-118 produced by DAI-NIPPON INK KAGAKU KOGYO CO., LTD.) | 46.2 parts by weight |
| Water-soluble melamine resin (Tradename: S-695 produced by DAI-NIPPON INK KAGAKU KOGYO CO., LTD.) | 12.6 parts by weight |
| Antifoaming agent (Tradename: NOPCO 8034 produced by SAN-NOPCO CO., LTD.) | 0.1 part by weight |
| Water | 9.1 parts by weight |
| Butyl Cellosolve | 1.6 parts by weight |

Examples 46 to 64, Comparative Example 7 to 9 and Reference Examples 7 to 9

The same procedure as defined in Example 45 was conducted except that various kinds of yellow iron oxide hydroxide pigments were used instead of that used in Example 45, thereby producing water-based paints.

The main production conditions and various properties of the obtained water-based paints are shown in Tables 14 and 15.

TABLE 14

| | Production of water-based paints | |
|---|---|---|
| Examples | Kinds of yellow iron oxide hydroxide particles (Example No.) | Kinds of resins |
| Example 45 | Example 3 | Water-soluble amino-alkyd resin Water-soluble melamine resin |
| Example 46 | Example 4 | Water-soluble amino-alkyd resin Water-soluble melamine resin |
| Example 47 | Example 5 | Water-soluble amino-alkyd resin Water-soluble melamine resin |
| Example 48 | Example 6 | Water-soluble amino-alkyd resin Water-soluble meiamine resin |
| Example 49 | Example 7 | Water-soluble amino-alkyd resin Water-soluble melamine resin |
| Example 50 | Example 15 | Water-soluble amino-alkyd resin Water-soluble melamine resin |
| Example 51 | Example 16 | Water-soluble amino-alkyd resin Water-soluble melamine resin |
| Example 52 | Example 17 | Water-soluble amino-alkyd resin Water-soluble melamine resin |
| Example 53 | Example 18 | Water-soluble amino-alkyd resin Water-soluble melamine resin |
| Example 54 | Example 19 | Water-soluble amino-alkyd resin Water-soluble melamine resin |
| Example 55 | Example 8 | Water-soluble amino-alkyd resin Water-soluble melamine resin |
| Example 56 | Example 9 | Water-soluble amino-alkyd resin Water-soluble melamine resin |
| Example 57 | Example 10 | Water-soluble amino-alkyd resin Water-soluble melamine resin |
| Example 58 | Example 11 | Water-soluble amino-alkyd resin Water-soluble melamine resin |
| Example 59 | Example 12 | Water-soluble amino-alkyd resin Water-soluble melamine resin |
| Example 60 | Example 20 | Water-soluble amino-alkyd resin Water-soluble melamine resin |
| Example 61 | Example 21 | Water-soluble amino-alkyd resin Water-soluble melamine resin |
| Example 62 | Example 22 | Water-soluble amino-alkyd resin Water-soluble melamine resin |
| Example 63 | Example 23 | Water-soluble amino-alkyd resin Water-soluble melamine resin |
| Example 64 | Example 24 | Water-soluble amino-alkyd resin Water-soluble melamine resin |

| | Properties of water-based paints Viscosity | Properties of coating film | |
|---|---|---|---|
| Examples | (cP) | Gloss (%) | Heat-resisting temperature of coating film (° C.) |
| Example 45 | 1,792 | 83 | 276 |
| Example 46 | 1,920 | 82 | 275 |
| Example 47 | 1,869 | 83 | 274 |
| Example 48 | 2,048 | 82 | 275 |
| Example 49 | 1,792 | 84 | 279 |
| Example 50 | 1,741 | 86 | 284 |
| Example 51 | 1,766 | 87 | 281 |
| Example 52 | 1,818 | 88 | 283 |
| Example 53 | 1,882 | 88 | 284 |
| Example 54 | 1,702 | 89 | 284 |
| Example 55 | 1,830 | 87 | 286 |
| Example 56 | 1,754 | 86 | 288 |
| Example 57 | 1,779 | 88 | 283 |
| Example 58 | 1,702 | 89 | 283 |
| Example 59 | 1,613 | 88 | 281 |
| Example 60 | 1,715 | 93 | 291 |
| Example 61 | 1,702 | 94 | 293 |
| Example 62 | 1,561 | 94 | 295 |
| Example 63 | 1,510 | 95 | 296 |
| Example 64 | 1,408 | 94 | 298 |

TABLE 14-continued

| Examples | Properties of coating film Hue | | |
|---|---|---|---|
| | L* value (−) | a* value (−) | b* value (−) |
| Example 45 | 61.6 | 17.4 | 50.9 |
| Example 46 | 62.9 | 17.4 | 51.6 |
| Example 47 | 59.8 | 18.8 | 49.3 |
| Example 48 | 58.9 | 17.3 | 48.9 |
| Example 49 | 60.1 | 18.3 | 48.4 |
| Example 50 | 61.9 | 17.7 | 52.1 |
| Example 51 | 62.9 | 17.8 | 52.1 |
| Example 52 | 59.6 | 18.4 | 49.6 |
| Example 53 | 59.1 | 16.6 | 48.3 |
| Example 54 | 58.3 | 18.8 | 47.1 |
| Example 55 | 62.4 | 16.8 | 51.8 |
| Example 56 | 63.0 | 17.7 | 52.0 |
| Example 57 | 58.6 | 18.2 | 49.3 |
| Example 58 | 58.6 | 17.5 | 48.3 |
| Example 59 | 57.3 | 18.3 | 47.0 |
| Example 60 | 61.6 | 17.2 | 51.5 |
| Example 61 | 62.5 | 17.6 | 52.9 |
| Example 62 | 60.6 | 18.1 | 50.6 |
| Example 63 | 59.4 | 17.6 | 47.3 |
| Example 64 | 57.0 | 18.8 | 47.0 |

TABLE 15

| Comparative Examples | Production of water-based paints | |
|---|---|---|
| | Kinds of yellow iron oxide hydroxide particles (Comparative Example No.) | Kinds of resins |
| Comparative Example 7 | Comparative Example 1 | Water-soluble amino-alkyd resin Water-soluble melamine resin |
| Comparative Example 8 | Comparative Example 2 | Water-soluble amino-alkyd resin Water-soluble melamine resin |
| Comparative Example 9 | Comparative Example 3 | Water-soluble amino-alkyd resin Water-soluble melamine resin |
| Reference Example 7 | Reference Example 1 | Water-soluble amino-alkyd resin Water-soluble melamine resin |
| Reference Example 8 | Reference Example 2 | Water-soluble amino-alkyd resin Water-soluble melamine resin |
| Reference Example 9 | Reference Example 3 | Water-soluble amino-alkyd resin Water-soluble melamine resin |

| Comparative Examples | Properties of coating film | | |
|---|---|---|---|
| | Properties of water-based paints Viscosity (cP) | Gloss (%) | Heat-resisting temperature of coating film (° C.) |
| Comparative Example 7 | 1,920 | 78 | 215 |
| Comparative Example 8 | 1,818 | 79 | 231 |
| Comparative Example 9 | 1,792 | 76 | 246 |
| Reference Example 7 | 1,741 | 78 | 252 |
| Reference Example 8 | 1,754 | 79 | 262 |
| Reference Example 9 | 1,715 | 76 | 260 |

TABLE 15-continued

| Comparative Examples | Properties of coating film Hue | | |
|---|---|---|---|
| | L* value (−) | a* value (−) | b* value (−) |
| Comparative Example 7 | 62.5 | 17.3 | 51.6 |
| Comparative Example 8 | 62.3 | 17.6 | 51.3 |
| Comparative Example 9 | 60.4 | 19.5 | 50.0 |
| Reference Example 7 | 60.1 | 19.4 | 48.8 |
| Reference Example 8 | 60.6 | 18.6 | 49.0 |
| Reference Example 9 | 60.8 | 18.4 | 49.4 |

Example 65

<Production of Resin Composition Containing Yellow Pigment>

1.5 g of yellow pigment composed of yellow iron oxide hydroxide particles obtained in Example 3 and 48.5 g of polyvinyl chloride (103EP8D produced by NIPPON ZEON CO., LTD.) were weighed, charged into a 100 cc beaker and intimately mixed together by a spatula to obtain mixed particles.

The thus obtained particles were mixed with 0.5 g of calcium stearate. The mixture was then gradually supplied to hot rolls which were heated at 160° C. and whose clearance was set to 0.2 mm, and continuously kneaded together until uniform resin composition was obtained. Thereafter, the obtained resin composition was separated from the hot rolls, and used as a raw material for colored resin plate.

Next, the above-mentioned resin composition was interposed between surface-polished stainless steel plates, and pressure-molded in a hot press heated to 180° C. while applying a pressing force of 1 ton/cm$^2$ thereto, thereby producing a colored resin plate having a thickness of 1 mm.

Examples 66 to 84, Comparative Examples 10 to 12 and Reference Examples 10 to 12

The same procedure as defined in Example 65 was conducted except that various kinds of yellow iron oxide hydroxide pigments were used instead of that used in Example 65, thereby producing resin compositions.

The main production conditions and various properties of the obtained resin compositions are shown in Tables 16 and 17.

TABLE 16

| | Production of resin composition | | |
|---|---|---|---|
| | Yellow iron oxide hydroxide particles | | |
| Examples | Kinds (Example No.) | Amount (part by weight) | Resin Kinds |
| Example 65 | Example 3 | 5.0 | Polyvinyl chloride resin 103EP8D (produced by Nippon Zeon Co., Ltd.) |
| Example 66 | Example 4 | 5.0 | Polyvinyl chloride resin 103EP8D (produced by Nippon Zeon Co., Ltd.) |
| Example 67 | Example 5 | 5.0 | Polyvinyl chloride resin 103EP8D (produced by Nippon Zeon Co., Ltd.) |

TABLE 16-continued

Production of resin composition

| Examples | Resin Amount (part by weight) | Additives Kinds | Additives Amount (part by weight) | temperature (° C.) |
|---|---|---|---|---|
| Example 68 | Example 6 | 5.0 | Polyvinyl chloride resin 103EP8D (produced by Nippon Zeon Co., Ltd.) | |
| Example 69 | Example 7 | 5.0 | Polyvinyl chloride resin 103EP8D (produced by Nippon Zeon Co., Ltd.) | |
| Example 70 | Example 15 | 5.0 | Polyvinyl chloride resin 103EP8D (produced by Nippon Zeon Co., Ltd.) | |
| Example 71 | Example 16 | 5.0 | Polyvinyl chloride resin 103EP8D (produced by Nippon Zeon Co., Ltd.) | |
| Example 72 | Example 17 | 5.0 | Polyvinyl chloride resin 103EP8D (produced by Nippon Zeon Co., Ltd.) | |
| Example 73 | Example 18 | 5.0 | Polyvinyl chloride resin 103EP8D (produced by Nippon Zeon Co., Ltd.) | |
| Example 74 | Example 19 | 5.0 | Polyvinyl chloride resin 103EP8D (produced by Nippon Zeon Co., Ltd.) | |
| Example 75 | Example 8 | 5.0 | Polyvinyl chloride resin 103EP8D (produced by Nippon Zeon Co., Ltd.) | |
| Example 76 | Example 9 | 5.0 | Polyvinyl chloride resin 103EP8D (produced by Nippon Zeon Co., Ltd.) | |
| Example 77 | Example 10 | 5.0 | Polyvinyl chloride resin 103EP8D (produced by Nippon Zeon Co., Ltd.) | |
| Example 78 | Example 11 | 5.0 | Polyvinyl chloride resin 103EP8D (produced by Nippon Zeon Co., Ltd.) | |
| Example 79 | Example 12 | 5.0 | Polyvinyl chloride resin 103EP8D (produced by Nippon Zeon Co., Ltd.) | |
| Example 80 | Example 20 | 5.0 | Polyvinyl chloride resin 103EP8D (produced by Nippon Zeon Co., Ltd.) | |
| Example 81 | Example 21 | 5.0 | Polyvinyl chloride resin 103EP8D (produced by Nippon Zeon Co., Ltd.) | |
| Example 82 | Example 22 | 5.0 | Polyvinyl chloride resin 103EP8D (produced by Nippon Zeon Co., Ltd.) | |
| Example 83 | Example 23 | 5.0 | Polyvinyl chloride resin 103EP8D (produced by Nippon Zeon Co., Ltd.) | |
| Example 84 | Example 24 | 5.0 | Polyvinyl chloride resin 103EP8D (produced by Nippon Zeon Co., Ltd.) | |
| Example 65 | 95.0 | Calcium stearate | 1.0 | 160 |
| Example 66 | 95.0 | Calcium stearate | 1.0 | 160 |
| Example 67 | 95.0 | Calcium stearate | 1.0 | 160 |
| Example 68 | 95.0 | Calcium stearate | 1.0 | 160 |
| Example 69 | 95.0 | Calcium stearate | 1.0 | 160 |
| Example 70 | 95.0 | Calcium stearate | 1.0 | 160 |
| Example 71 | 95.0 | Calcium stearate | 1.0 | 160 |
| Example 72 | 95.0 | Calcium stearate | 1.0 | 160 |
| Example 73 | 95.0 | Calcium stearate | 1.0 | 160 |
| Example 74 | 95.0 | Calcium stearate | 1.0 | 160 |
| Example 75 | 95.0 | Calcium stearate | 1.0 | 160 |
| Example 76 | 95.0 | Calcium stearate | 1.0 | 160 |
| Example 77 | 95.0 | Calcium stearate | 1.0 | 160 |
| Example 78 | 95.0 | Calcium stearate | 1.0 | 160 |
| Example 79 | 95.0 | Calcium stearate | 1.0 | 160 |
| Example 80 | 95.0 | Calcium stearate | 1.0 | 160 |
| Example 81 | 95.0 | Calcium stearate | 1.0 | 160 |
| Example 82 | 95.0 | Calcium stearate | 1.0 | 160 |
| Example 83 | 95.0 | Calcium stearate | 1.0 | 160 |
| Example 84 | 95.0 | Calcium stearate | 1.0 | 160 |

Properties of resin composition

| Examples | Dispersing state (−) | Heat-resistance temperature of resin composition (° C.) | Hue L* value (−) | Hue a* value (−) | Hue b* value (−) |
|---|---|---|---|---|---|
| Example 65 | 4 | 213 | 62.8 | 17.1 | 51.6 |
| Example 66 | 4 | 214 | 64.1 | 17.1 | 52.1 |
| Example 67 | 4 | 213 | 60.3 | 17.6 | 50.6 |
| Example 68 | 4 | 211 | 60.0 | 16.8 | 50.3 |
| Example 69 | 5 | 214 | 59.9 | 18.0 | 51.0 |
| Example 70 | 4 | 216 | 63.4 | 17.0 | 53.6 |
| Example 71 | 5 | 218 | 64.4 | 17.3 | 53.8 |
| Example 72 | 4 | 217 | 60.7 | 17.8 | 51.3 |
| Example 73 | 5 | 216 | 59.9 | 16.1 | 49.6 |
| Example 74 | 5 | 219 | 59.7 | 18.2 | 48.8 |
| Example 75 | 4 | 217 | 63.8 | 16.1 | 53.6 |
| Example 76 | 5 | 217 | 64.1 | 17.3 | 53.8 |
| Example 77 | 5 | 219 | 60.3 | 17.9 | 50.6 |
| Example 78 | 5 | 218 | 60.4 | 16.9 | 49.8 |
| Example 79 | 4 | 216 | 58.1 | 18.1 | 48.3 |
| Example 80 | 5 | 226 | 63.0 | 17.1 | 53.6 |
| Example 81 | 5 | 228 | 63.6 | 17.3 | 54.1 |
| Example 82 | 5 | 226 | 61.8 | 17.8 | 51.2 |
| Example 83 | 5 | 223 | 60.6 | 17.1 | 48.6 |
| Example 84 | 5 | 228 | 58.9 | 18.3 | 48.3 |

TABLE 17

Production of resin composition

| Comparative Examples | Yellow iron oxide hydroxide particles Kinds (Comparative Example No.) | Yellow iron oxide hydroxide particles Amount (part by weight) | Resin Kinds | Resin Amount (part by weight) |
|---|---|---|---|---|
| Comparative Example 10 | Comparative Example 1 | 5.0 | Polyvinyl chloride resin 103EP8D (produced by Nippon Zeon Co., Ltd.) | 95.0 |
| Comparative Example 11 | Comparative Example 2 | 5.0 | Polyvinyl chloride resin 103EP8D (produced by Nippon Zeon Co., Ltd.) | 95.0 |
| Comparative Example 12 | Comparative Example 3 | 5.0 | Polyvinyl chloride resin 103EP8D (produced by Nippon Zeon Co., Ltd.) | 95.0 |
| Reference Example 10 | Reference Example 1 | 5.0 | Polyvinyl chloride resin 103EP8D (produced by Nippon Zeon Co., Ltd.) | 95.0 |
| Reference Example 11 | Reference Example 2 | 5.0 | Polyvinyl chloride resin 103EP8D (produced by Nippon Zeon Co., Ltd.) | 95.0 |
| Reference Example 12 | Reference Example 3 | 5.0 | Polyvinyl chloride resin 103EP8D (produced by Nippon Zeon Co., Ltd.) | 95.0 |

TABLE 17-continued

| | Production of resin composition | | |
|---|---|---|---|
| | Additives | | Kneading |
| Comparative Examples | Kinds | Amount (part by weight) | temperature (° C.) |
| Comparative Example 10 | Calcium stearate | 1.0 | 160 |
| Comparative Example 11 | Calcium stearate | 1.0 | 160 |
| Comparative Example 12 | Calcium stearate | 1.0 | 160 |
| Reference Example 10 | Calcium stearate | 1.0 | 160 |
| Reference Example 11 | Calcium stearate | 1.0 | 160 |
| Reference Example 12 | Calcium stearate | 1.0 | 160 |

| | Properties of resin composition | | | | |
|---|---|---|---|---|---|
| | | Heat-resistance temperature | Hue | | |
| Comparative Examples | Dispersing state (−) | of resin composition (° C.) | L* value (−) | a* value (−) | b* value (−) |
| Comparative Example 10 | 1 | 186 | 63.8 | 16.8 | 53.2 |
| Comparative Example 11 | 3 | 195 | 63.2 | 17.3 | 52.6 |
| Comparative Example 12 | 2 | 191 | 62.1 | 19.1 | 51.3 |
| Reference Example 10 | 3 | 190 | 61.9 | 19.0 | 50.2 |
| Reference Example 11 | 2 | 193 | 62.4 | 18.5 | 50.8 |
| Reference Example 12 | 2 | 191 | 62.6 | 18.2 | 51.1 |

What is claimed is:

1. Yellow iron oxide hydroxide particles comprising:
   iron oxide hydroxide particle as a core, and
   composite oxide hydroxide of Fe and Al deposited on surface of said iron oxide hydroxide particle as a core wherein the amount of Al in said composite oxide hydroxide is 0.1 to 10% by weight, calculated as Al, based on the weight of said iron oxide hydroxide as a core, the amount of Fe in said composite oxide hydroxide is 0.1 to 50% by weight, calculated as Fe, based on the weight of said iron oxide hydroxide particle as a core, and the ratio of Al to Fe in said composite oxide hydroxide is 0.05:1 to 2:1, calculated as Al and Fe atoms,
   said yellow iron oxide hydroxide particles having an average major axis diameter of 0.1 to 1.0 μm, an average minor axis diameter of 0.02 to 0.10 μm, an aspect ratio (major axis diameter/minor axis diameter) of 2 to 20, a BET specific surface area of 10 to 180 m$^2$/g and a heat-resistance temperature of not less than 255° C.

2. Yellow iron oxide hydroxide particles according to claim 1, which further has a change in hue from that of said iron oxide hydroxide particle as a core, of ΔL* value of −1.0 to +1.0, Δa* value of −1.0 to +1.0 and Δb* value of −1.0 to +1.0.

3. Yellow iron oxide hydroxide particles according to claim 1, which further have a gloss of 70 to 110% when light is irradiated on a coating film containing the yellow iron oxide hydroxide particles at an incident angle of 20°.

4. Yellow iron oxide hydroxide particles according to claim 1, wherein the amount of Al in said composite oxide hydroxide is 0.15 to 8% by weight, calculated as Al, based on the weight of said iron oxide hydroxide particle as a core, the amount of Fe in said composite oxide hydroxide is 0.15 to 30% by weight, calculated as Fe, based on the weight of said iron oxide hydroxide particle as a core, and the ratio of Al to Fe in said composite oxide hydroxide is 0.1:1 to 1:1, calculated as Al and Fe atoms.

5. Yellow iron oxide hydroxide particles according to claim 1, wherein the average major axis diameter is 0.15 to 0.8 μm, the average minor axis diameter is 0.025 to 0.08 μm, the aspect ratio (major axis diameter/minor axis diameter) is 2.5 to 15, and the BET specific surface area is 12 to 150 m$^2$/g.

6. Yellow iron oxide hydroxide particles according to claim 1, wherein the heat-resistance temperature is not less than 265° C.

7. Yellow iron oxide hydroxide particles according to claim 2, wherein the change in hue from that of said iron oxide hydroxide particle as a core, is ΔL* value of −0.5 to +0.5, Δa* value of −0.5 to +0.5 and Δb* value of −0.5 to +0.5.

8. Yellow iron oxide hydroxide particles according to claim 3, wherein the gloss is 80 to 110% when light is irradiated on a coating film containing the yellow iron oxide hydroxide particles at an incident angle of 20°.

9. Yellow iron oxide hydroxide particles comprising:
   iron oxide hydroxide particle as a core;
   composite oxide hydroxide of Fe and Al deposited on surface of said iron oxide hydroxide particle as a core wherein the amount of Al in said composite oxide hydroxide is 0.1 to 10% by weight, calculated as Al, based on the weight of said iron oxide hydroxide as a core, the amount of Fe in said composite oxide hydroxide is 0.1 to 50% by weight, calculated as Fe, based on the weight of said iron oxide hydroxide particle as a core, and the ratio of Al to Fe in said composite oxide hydroxide is 0.05:1 to 2:1, calculated as Al and Fe atoms; and
   a hydroxide of aluminum deposited on a surface of said composite oxide hydroxide,
   said yellow iron oxide hydroxide particles having an average major axis diameter of 0.1 to 1.0 μm, an average minor axis diameter of 0.02 to 0.10 μm, an aspect ratio (major axis diameter/minor axis diameter) to 2 to 20, a BET specific surface area of 10 to 180 m$^2$/g; and having a heat resistance temperature of not less than 265° C.

10. Yellow iron oxide hydroxide particles according to claim 9, wherein the amount of said hydroxide of aluminum deposited on said composite oxide hydroxide is 0.1 to 20.0% by weight, calculated as Al, based on the weight of said iron oxide hydroxide particles.

11. Yellow iron oxide hydroxide particles according to claim 9, which further have a change in hue from that of said iron oxide hydroxide particle as a core, of ΔL* value of −1.0 to +1.0, Δa* value of −1.0 to +1.0 and Δb* value of −1.0 to +1.0.

12. Yellow iron oxide hydroxide particles according to claim 9, which further have a gloss of 75 to 115% when light is irradiated on a coating film containing the yellow iron oxide hydroxide particles at an incident angle of 20°.

13. Yellow iron oxide hydroxide particles according to claim 9, wherein the heat-resistance temperature is not less than 275° C.

14. Yellow iron oxide hydroxide particles according to claim 11, wherein the change in hue from that of said iron oxide hydroxide particle as a core, is $\Delta L^*$ value of $-0.5$ to $+0.5$, $\Delta a^*$ value of $-0.5$ to $+0.5$ and $\Delta b^*$ value of $-0.5$ to $+0.5$.

15. Yellow iron oxide hydroxide particles according to claim 12, wherein the gloss is 85 to 115% when light is irradiated on a coating film containing the yellow iron oxide hydroxide particles at an incident angle of 20°.

16. Yellow iron oxide hydroxide particles comprising:
iron oxide hydroxide particle as a core; and
composite oxide hydroxide of Fe and Al deposited on the surface of said iron oxide hydroxide particle as a core wherein the amount of Al in said composite oxide hydroxide is 0.1 to 10% by weight, calculated as Al, based on the weight of said iron oxide hydroxide as a core, the amount of Fe in said composite oxide hydroxide is 0.1 to 50% by weight, calculated as Fe, based on the weight of said iron oxide hydroxide particle as a core, and the ratio of Al to Fe in said composite oxide hydroxide is 0.05:1 to 2:1, calculated as Al and Fe atoms;
said yellow iron oxide hydroxide particles having an average major axis diameter of 0.1 to 1.0 μm, an average minor axis diameter of 0.02 to 0.10 μm. an aspect ratio (major axis diameter/minor axis diameter) to 2 to 20, a BET specific surface area of 10 to 180 m²/g; and having a heat-resistance temperature of not less than 265° C., and comprising a soluble sodium salt content of not more than 1,000 ppm, calculated as Na, and a soluble sulfate content of not more than 2,000 ppm, calculated as $SO_4$.

17. Yellow iron oxide hydroxide particles according to claim 16, which further has a change in hue from that of said iron oxide hydroxide particle as a core, of $\Delta L^*$ value of $-1.0$ to $+1.0$, $\Delta a^*$ value of $-1.0$ to $+1.0$ and $\Delta b^*$ value of $-1.0$ to $+1.0$.

18. Yellow iron oxide hydroxide particles according to claim 16, which further have a gloss of 80 to 120% when light is irradiated on a coating film containing the yellow iron oxide hydroxide particles at an incident angle of 20°.

19. Yellow iron oxide hydroxide particles according to claim 16, wherein the heat-resistance temperature of not less than 270° C.

20. Yellow iron oxide hydroxide particles according to claim 17, wherein the change in hue from that of said iron oxide hydroxide particle as a core, is $\Delta L^*$ value of $-0.5$ to $+0.5$, $\Delta a^*$ value of $-0.5$ to $+0.5$ and $\Delta b^*$ value of $-0.5$ to $+0.5$.

21. Yellow iron oxide hydroxide particles according to claim 18, wherein the gloss is 90 to 115% when light is irradiated on a coating film containing the yellow iron oxide hydroxide particles at an incident angle of 20°.

22. Yellow iron oxide hydroxide particles according to claim 16, wherein the soluble sodium salt content of not more than 700 ppm, calculated as Na, and a soluble sulfate content of not more than 1,500 ppm, calculated as $SO_4$.

23. Yellow iron oxide hydroxide particles according to claim 16, which further comprise a hydroxide of aluminum deposited on a surface of said composite oxide hydroxide and has a heat-resistance temperature of not less than 275° C.

24. Yellow iron oxide hydroxide particles according to claim 23, wherein the amount of said hydroxide of aluminum deposited on said composite oxide hydroxide is deposited is 0.1 to 20.0% by weight, calculated as Al, based on the weight of said iron oxide hydroxide particles.

25. Yellow iron oxide hydroxide particles according to claim 23, which further have a change in hue from that of said iron oxide hydroxide particle as a core, of $\Delta L^*$ value of $-1.0$ to $+1.0$, $\Delta a^*$ value of $-1.0$ to $+1.0$ and $\Delta b^*$ value of $-1.0$ to $+1.0$.

26. Yellow iron oxide hydroxide particles according to claim 23, which further have a gloss of 85 to 120% when light is irradiated on a coating film containing the yellow iron oxide hydroxide particles at an incident angle of 20°.

27. Yellow iron oxide hydroxide particles according to claim 23, wherein the heat-resistance temperature is not less than 280° C.

28. Yellow iron oxide hydroxide particles according to claim 25, wherein the change in hue from that of said iron oxide hydroxide particle as a core, of $\Delta L^*$ value of $-0.5$ to $+0.5$, $\Delta a^*$ value of $-0.5$ to $+0.5$ and $\Delta b^*$ value of $-0.5$ to $+0.5$.

29. Yellow iron oxide hydroxide particles according to claim 26, wherein the gloss is 90 to 120% when light is irradiated on a coating film containing the yellow iron oxide hydroxide particles at an incident angle of 20°.

30. A pigment comprising yellow iron oxide hydroxide particles as defined in claim 1.

31. A paint comprising a paint base material and the pigment as defined in claim 30.

32. A paint according to claim 31, wherein the amount of said pigment is 10 to 90 parts by weight based on 100 parts by weight of said paint base material.

33. A rubber or resin composition comprising a rubber or resin base material and the pigment as defined in claim 30.

34. A rubber or resin composition according to claim 33, wherein the amount of said pigment is 0.01 to 200 parts by weight based on 100 parts by weight of said rubber or resin base material.

35. A process for producing heat-resistant yellow iron oxide hydroxide particles, comprising:
adding to a water dispersion containing iron oxide hydroxide particles, an aluminum compound and a ferrous salt compound in amounts of 0.1 to 10% by weight, calculated as Al, and 0.1 to 50% by weight, calculated as Fe, respectively, based on the weight of said iron oxide hydroxide particles, under stirring; and
passing an oxygen-containing gas through the resultant water dispersion to deposit a composite oxide hydroxide of Fe and Al on surfaces of said iron oxide hydroxide particles, thereby obtaining yellow iron oxide hydroxide particles on which said composite oxide hydroxide of Fe and Al is deposited.

36. A process for producing heat-resistant yellow iron oxide hydroxide particles comprising:
adding to a water dispersion containing iron oxide hydroxide particles, an aluminum compound and a ferrous salt compound in amounts of 0.1 to 10% by weight, calculated as Al, and 0.1 to 50% by weight, calculated as Fe, respectively, based on the weight of said iron oxide hydroxide particles, while stirring;
passing an oxygen-containing gas through the resultant water dispersion to deposit a composite oxide hydroxide of Fe and Al on surfaces of said iron oxide hydroxide particle, thereby obtaining yellow iron oxide hydroxide particles on which said composite oxide hydroxide of Fe and Al is deposited;
adjusting the pH value of said water dispersion containing said iron oxide hydroxide particles on which said composite oxide hydroxide is deposited, to not less than 10 or not more than 4;
adding an aluminum compound to said water dispersion under stirring;

adjusting the pH value of said water dispersion to 5 to 9 to deposit a hydroxide of aluminum on a surface of said composite oxide hydroxide, thereby obtaining yellow iron oxide hydroxide particles on which said composite oxide hydroxide of Fe and Al and said hydroxide of aluminum are successively deposited.

37. A process for producing heat-resistant yellow iron oxide hydroxide particles, comprising:

heat-treating iron oxide hydroxide particles in an aqueous alkaline solution having a pH value of not less than 10, followed by filtering and washing with water, thereby reducing the content of a soluble sulfate in said iron oxide hydroxide particles to not more than 2,000 ppm, calculated as $SO_4$;

heat-treating the obtained iron oxide hydroxide particles in an aqueous acid solution having a pH value of not more than 4, followed by filtering and washing with water, thereby reducing the content of a soluble sodium salt in said iron oxide hydroxide particles to not more than 1,000 ppm, calculated as Na, to obtain high purity iron oxide hydroxide particles containing less amounts of said soluble sulfate and said soluble sodium salt;

adding to a water dispersion containing said high purity iron oxide hydroxide particles, an aluminum compound and a ferrous salt compound in amounts of 0.1 to 10% by weight, calculated as Al, and 0.1 to 50% by weight, calculated as Fe, respectively, based on the weight of said high purity iron oxide hydroxide particles, under stirring; and passing an oxygen-containing gas through said water dispersion to deposit a composite oxide hydroxide of Fe and Al on surfaces of said high purity iron oxide hydroxide particles, thereby obtaining high purity yellow iron oxide hydroxide particles on which said composite oxide hydroxide of Fe and Al is deposited.

38. A process for producing heat-resistant yellow iron oxide hydroxide particles according to claim 37, which further comprises:

adjusting the pH value of said water dispersion containing said high purity iron oxide hydroxide particles on which said composite oxide hydroxide is deposited, to not less than 10 or not more than 4;

adding an aluminum compound to said water dispersion, followed by stirring; and adjusting the pH value of said water dispersion to 5 to 9 to deposit a hydroxide of aluminum on a surface of said composite oxide hydroxide, thereby obtaining high purity yellow iron oxide hydroxide particles on which said composite oxide hydroxide of Fe and Al and said hydroxide of aluminum are successively deposited.

39. A pigment comprising yellow iron oxide hydroxide particles as defined in claim 9.

40. A paint comprising a paint base material and the pigment as defined in claim 39.

41. A paint according to claim 40, wherein the amount of said pigment is 10 to 90 parts by weight based on 100 parts by weight of said paint base material.

42. A rubber or resin composition comprising a rubber or resin base material and the pigment as defined in claim 39.

43. A rubber or resin composition according to claim 42, wherein the amount of said pigment is 0.01 to 200 parts by weight based on 100 parts by weight of said rubber or resin base material.

44. A pigment comprising yellow iron oxide hydroxide particles as defined in claim 16.

45. A paint comprising a paint base material and the pigment as defined in claim 44.

46. A paint according to claim 45, wherein the amount of said pigment is 10 to 90 parts by weight based on 100 parts by weight of said paint base material.

47. A rubber or resin composition comprising a rubber or resin base material and the pigment as defined in claim 44.

48. A rubber or resin composition according to claim 47, wherein the amount of said pigment is 0.01 to 200 parts by weight based on 100 parts by weight of said rubber or resin base material.

* * * * *